(12) United States Patent
Shao-Horn et al.

(10) Patent No.: US 11,220,753 B2
(45) Date of Patent: Jan. 11, 2022

(54) PEROVSKITES FOR CATALYZING OXYGEN

(71) Applicant: MASSACHUSETTS INSTITUTE OF TECHNOLOGY, Cambridge, MA (US)

(72) Inventors: Yang Shao-Horn, Newton, MA (US); Yuriy Roman, Cambridge, MA (US); Denis Kuznetsov, Cambridge, MA (US); Livia Giordano, Cambridge, MA (US); Jiayu Peng, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 17/251,586

(22) PCT Filed: Jun. 15, 2019

(86) PCT No.: PCT/US2019/037397
§ 371 (c)(1),
(2) Date: Dec. 11, 2020

(87) PCT Pub. No.: WO2019/245929
PCT Pub. Date: Dec. 26, 2019

(65) Prior Publication Data
US 2021/0115580 A1 Apr. 22, 2021

Related U.S. Application Data

(60) Provisional application No. 62/685,726, filed on Jun. 15, 2018.

(51) Int. Cl.
*C25B 11/04* (2021.01)
*C25B 11/077* (2021.01)
(Continued)

(52) U.S. Cl.
CPC ......... *C25B 11/0773* (2021.01); *B01J 23/002* (2013.01); *B01J 23/8437* (2013.01); *C25B 1/04* (2013.01)

(58) Field of Classification Search
CPC ..... C25B 11/04; C25B 11/093; C25B 11/091; C25B 11/073; C25B 9/00; C25B 11/075;
(Continued)

(56) References Cited

U.S. PATENT DOCUMENTS

| 6,033,632 A | 3/2000 | Schwartz et al. |
| 2016/0122886 A1* | 5/2016 | Wang ............... B01J 20/06 205/551 |

FOREIGN PATENT DOCUMENTS

| CA | 1305751 C | 7/1992 |
| CN | 102220639 B | 6/2013 |

OTHER PUBLICATIONS

"Christopher S. Knee; Influence of Oxygen Defects on the Structure and Magnetic Properties of Sr1—xBixCoO3—y (0.1 ≤ x ≤ 0.2) Supercell Perovskites; American Chemical Society; 2006; pp. 1354-1364" (Year: 2006).*

(Continued)

*Primary Examiner* — Zulmariam Mendez
(74) *Attorney, Agent, or Firm* — Honigman LLP

(57) ABSTRACT

The oxygen evolution reaction (OER) system includes a bismuth strontium cobalt oxide.

17 Claims, 23 Drawing Sheets

(51) Int. Cl.
*B01J 23/00* (2006.01)
*B01J 23/843* (2006.01)
*C25B 1/04* (2021.01)

(58) Field of Classification Search
CPC ..... C25B 11/00; C25B 11/051; C25B 11/077; C25B 9/65; B01J 23/8913
See application file for complete search history.

(56) References Cited

OTHER PUBLICATIONS

Mefford, JT et al. "Water electrolysis on La1—xSrxCoO3-delta perovskite electrocatalysts" Nature Comunications; Mar. 23, 2016.
International Search Report dated Aug. 23, 2019 in corresponding International Application No. PCT/US2019/037397.
Written Opinion of the International Searching Authority dated Aug. 23, 2019 in corresponding International Application No. PCT/US2019/037397.

* cited by examiner

PEROVSKITES FOR CATALYZING OXYGEN

PRIORITY CLAIM

This application is a National Phase application filed under 35 USC § 371 of International Application No. PCT/US2019/037397, filed on Jun. 15, 2019, which claims the benefit of prior filed U.S. Provisional Patent Application No. 62/685,726, filed Jun. 15, 2018, each of which is incorporated by reference in its entirety.

TECHNICAL FIELD

This invention relates to electrochemical methods and systems using catalytic materials, e.g., for catalysis of the oxygen evolution reaction.

BACKGROUND

Hydrogen gas and metal-air batteries exhibit many advantages as a carbon-free energy storage medium. Both have the highest energy density by mass of all energy storage technologies. The hydrogen gas may be readily formed in a sustainable fashion via the electrolysis of water powered by renewable energy, and metal-air batteries may also be charged by an application of renewable electricity. Widespread adoption of hydrogen fuels and metal air batteries depends on control over electron transfer reactions, in particular the oxygen evolution reaction (OER), written as:

$$2H_2O \rightarrow O_2 + 4H^+ + 4e^- \quad (1)$$

in the case of low pH water electrolysis, or written as:

$$4OH^- \rightarrow O_2 + 2H_2O + 4e^- \quad (2)$$

in the case of high pH water electrolysis, or lastly as:

$$M_xO_y \rightarrow (y/2)O_2 + xM^{(2y/x)+} + 4e^- \quad (3)$$

in the case of metal-air batteries, all of which occur at catalyst surfaces. For (1) and (2), the OER occurs in solar-driven water splitting or an electrolyzer, using electricity to produce hydrogen and oxygen gases. For (3), the OER occurs in an electricity-driven charging of metal-air batteries, using electrical power to form a reduced form of metal and/or metal oxides, and oxygen gases.

Well-known catalysts for the OER include expensive precious metals and precious metal oxides, for example $IrO_2$. However, the prohibitive cost and scarcity of precious metal elements limit their usage in practical applications. First-row transition-metal oxides (such as $NiCo_2O_4$ and cobalt-phosphate-based catalysts) offer alternative solutions, but can be less active than $IrO_2$.

SUMMARY

In one aspect, an electrochemical system can include a voltage source electrically connected to a first electrode and a second electrode; and an electrolyte in contact with the first electrode and the second electrode; wherein the second electrode includes a catalyst of formula (I):

$$Bi_xSr_{1-x}CoO_{3\pm\delta} \quad (I)$$

where x is in the range of 0.1 to 0.4 and δ is in the range of 0 to 1; and wherein the system is configured such that the catalyst catalyzes the oxygen evolution reaction when an oxygen-generating voltage is applied across the first electrode and the second electrode.

In another aspect, an electrode can include a catalyst of formula (I):

$$Bi_xSr_{1-x}CoO_{3\pm\delta} \quad (I)$$

where x is in the range of 0.1 to 0.4 and δ is in the range of 0 to 1.

In another aspect, a method of generating oxygen can include applying the oxygen-generating voltage to the system or electrode.

In certain circumstances, x can be 0.15, 0.20, 0.25, 0.30, or 0.35.

In certain circumstances, δ can be in the range of 0 to 0.5, 0 to 0.15, 0 to 0.1, 0 to 0.05, or approximately zero.

Other aspects, embodiments, and features will be apparent from the following description, the drawings, and the claims.

BRIEF DESCRIPTION OF THE DRAWINGS

FIG. 8 is a graph depicting charging curves for $Bi_{0.2}Sr_{0.8}CoO_{3-\delta}$ electrodes held at constant current density 6.1 $mA\ g^{-1}$ for 20 h (C/20), or at 2.4 $mA\ g^{-1}$ for 50 h (C/50). Galvanostatic experiments were performed for oxides films containing Nafion and acetylene black carbon supported on a glassy carbon electrode in $O_2$-saturated 1 M KOH electrolyte with an oxide loading of 0.25 $mg_{oxide}\ cm^{-2}_{disk}$ (referred to as "ink") or for pelletized $Bi_{0.2}Sr_{0.8}CoO_{3-\delta}$ powder (60 mg, 5 mm diameter pellet) attached to a graphene sheet (0.120 mm thickness) (referred to as "pellet") in $O_2$-saturated 1M KOH.

DETAILED DESCRIPTION

Here we report the synthesis of a bismuth-substituted strontium cobalt perovskite, $Bi_{0.2}Sr_{0.8}CoO_{3-\delta}$, which showed a record intrinsic activity for oxygen evolution reaction (OER) in basic solution. OER kinetics of $Bi_{0.2}Sr_{0.8}CoO_{3-\delta}$ were found to have a low Tafel slope (<30 mV/decade) and pH dependence on RHE scale assuming the decoupling of proton and electron transfer during one of the OER steps. The enhanced OER kinetics of $Bi_{0.2}Sr_{0.8}CoO_{3-\delta}$ relative to other active catalysts such as $SrCoO_{3-\delta}$ can be attributed to the presence of electronegative strong Lewis acid $Bi^{3+}$ ions which can influence the surface charge facilitating deprotonation kinetics, and also enhance oxide stability by having lowered O p band center of $Bi_{0.2}Sr_{0.8}CoO_{3-\delta}$ relative to the Fermi level via partial Co reduction and inductive effect. This work demonstrates a novel design strategy for enhancement of the OER activity and stability of oxide catalysts by the inductive effect induced by metal substitution to enable efficient and sustainable energy storage.

Figure 1A:
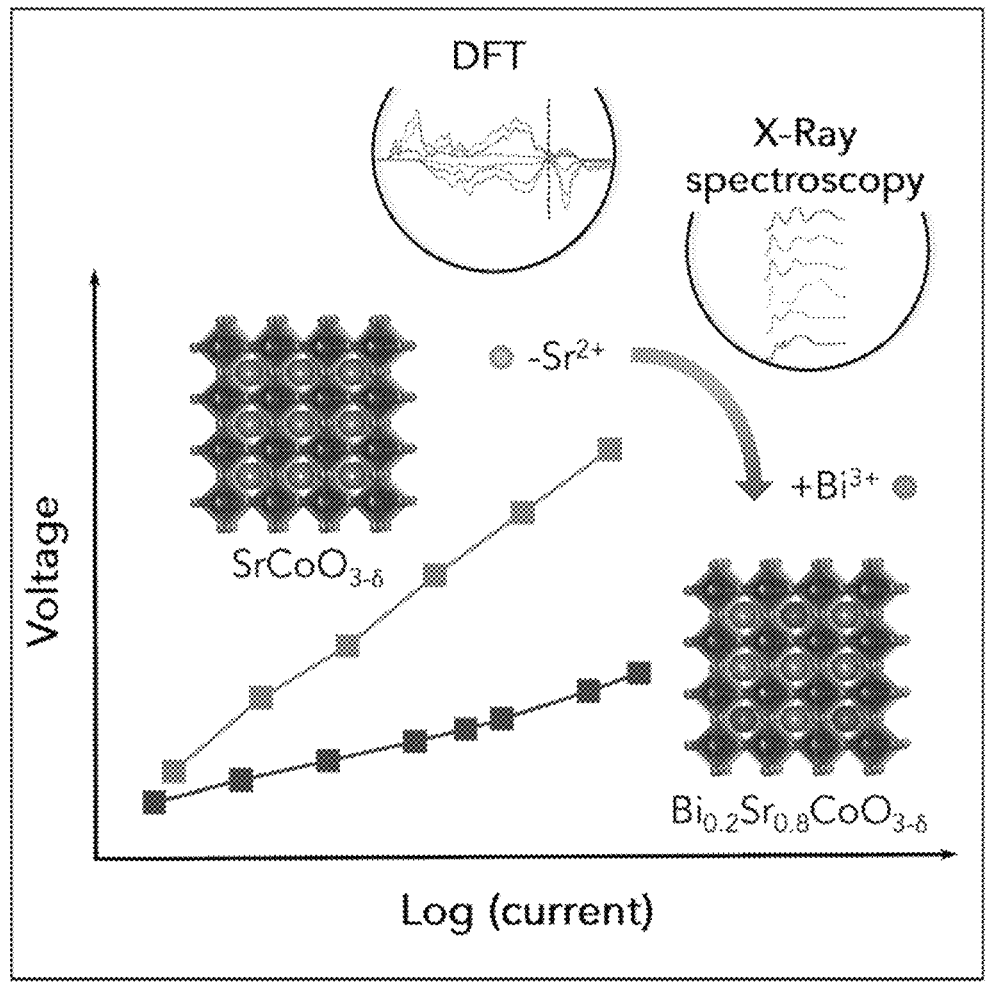
FIG. 1A is a depiction of properties of a composition described herein.

FIG. 1A depicts aspects of this development.

The distribution and on-demand use of electrical energy from sustainable resources such as solar energy requires storage technologies that are cost effective and involving earth-abundant elements. See, for example, Gray, H. B. Powering the Planet with Solar Fuel. *Nat. Chem.* 2009, 1, 7-7; Lewis, N. S.; Nocera, D. G. Powering the Planet: Chemical Challenges in Solar Energy Utilization. *Proc. Natl. Acad. Sci. U S. A.* 2006, 103, 15729-15735; Montoya, J. H.; Seitz, L. C.; Chakthranont, P.; Vojvodic, A.; Jaramillo, T. F.; Norskov, J. K. Materials for Solar Fuels and Chemicals. *Nat. Mater.* 2017, 16, 70-81; and Tachibana, Y.; Vayssieres, L.; Durrant, J. R. Artificial Photosynthesis for Solar Water Splitting. *Nat. Photonics* 2012, 6, 511-518, each of which is incorporated by reference in its entirety. Solar energy can be stored in form of chemical bonds by water splitting or $CO_2$ reduction to produce hydrogen or hydrocarbons (e.g. CO, methanol and methane) as energy carriers, where oxygen evolution reaction (OER) is required to complete these reactions. These technologies are advantageous to lithium ion batteries for large-scale storage as they have high gravimetric energy, and chemical bonds used for energy storage involve elements (such as O, H, C) that are among the most abundant in the planet. In contrast, energy storage with current Li-ion batteries requires storing each electron using one transition metal ion, and thus powering the planet with this technology is limited by the availability of metals such as cobalt and nickel in the earth crust. The efficiency of these storage technologies is, however, severely limited by the catalysis of the oxygen evolution reaction, which is characterized by slow kinetics and the need for precious metal catalysts such as $RuO_2$ and $IrO_2$. See, for example, McCrory, C. C. L.; Jung, S.; Ferrer, I. M.; Chatman, S. M.; Peters, J. C.; Jaramillo, T. F. Benchmarking Hydrogen Evolving Reaction and Oxygen Evolving Reaction Electrocatalysts for Solar Water Splitting Devices. *J. Am. Chem. Soc.* 2015, 137, 4347-4357; Hong, W. T.; Risch, M.; Stoerzinger, K. A.; Grimaud, A.; Suntivich, J.; Shao-Horn, Y. Toward the Rational Design of Non-Precious Transition Metal Oxides for Oxygen Electrocatalysis. *Energy Environ. Sci.* 2015, 8, 1404-1427; Dau H.; Limberg C.; Reier T.; Risch M.; Roggan S.; Strasser P. The Mechanism of Water Oxidation: From Electrolysis via Homogeneous to Biological Catalysis. *ChemCatChem* 2010, 2, 724-761; Lee, Y.; Suntivich, J.; May, K. J.; Perry, E. E.; Shao-Horn, Y. Synthesis and Activities of Rutile IrO2 and RuO2 Nanoparticles for Oxygen Evolution in Acid and Alkaline Solutions. *J. Phys. Chem. Lett.* 2012, 3, 399-404; Fang, Y.-H.; Liu, Z.-P. Mechanism and Tafel Lines of Electro-Oxidation of Water to Oxygen on RuO2(110). *J. Am. Chem. Soc.* 2010, 132, 18214-18222; Reier, T.; Oezaslan, M.; Strasser, P. Electrocatalytic Oxygen Evolution Reaction (OER) on Ru, Ir, and Pt Catalysts: A Comparative Study of Nanoparticles and Bulk Materials. *ACS Catal.* 2012, 2, 1765-1772; Sanchez Casalongue, H. G.; Ng, M. L.; Kaya, S.; Friebel, D.; Ogasawara, H.; Nilsson, A. In Situ Observation of Surface Species on Iridium Oxide Nanoparticles during the Oxygen Evolution Reaction. *Angew. Chem.* 2014, 126, 7297-7300; Bernicke, M.; Ortel, E.; Reier, T.; Bergmann, A.; Ferreira de Araujo, J.; Strasser, P.; Kraehnert, R. Iridium Oxide Coatings with Templated Porosity as Highly Active Oxygen Evolution Catalysts: Structure-Activity Relationships. *ChemSusChem* 2015, 8, 1908-1915, each of which is incorporated by reference in its entirety. The development of the efficient electrocatalysts for the oxygen evolution reaction (OER) composed of earth-abundant materials is therefore crucial for the large-scale implementation of these technologies. See, for example, Du, P.; Eisenberg, R. Catalysts Made of Earth-Abundant Elements (Co, Ni, Fe) for Water Splitting: Recent Progress and Future Challenges. *Energy Environ. Sci.* 2012, 5, 6012-6021; and Suen, N.-T.; Hung, S.-F.; Quan, Q.; Zhang, N.; Xu, Y.-J.; Chen, H. M. Electrocatalysis for the Oxygen Evolution Reaction: Recent Development and Future Perspectives. *Chem. Soc. Rev.* 2017, 46, 337-365, each of which is incorporated by reference in its entirety.

Here, we employ the recently reported inductive effect associated with metal substitution to examine the redox potentials and OER activity of cobalt-based perovskites. Metal substituents with higher affinity to electrons, i.e. higher electronegativity, than parent metal ions can pull electrons from parent metal ions and lower the energy of antibonding states of metal-ligand, lowering the electron energy associated with the redox of M-ligand, and shifting the redox potential positively, which is shown to correlate with enhanced OER activity. See, for example, Kuznetsov, D. A.; Han, B.; Yu, Y.; Rao, R. R.; Hwang, J.; Román-Leshkov, Y.; Shao-Horn, Y. Tuning Redox Transitions via Inductive Effect in Metal Oxides and Complexes, and Implications in Oxygen Electrocatalysis. *Joule* 2018, 2, 225-244, which is incorporated by reference in its entirety. Here we examine the OER activity of bismuth-substituted strontium cobalt oxide, $Bi_{0.2}Sr_{0.8}CoO_{3-\delta}$, where the $Bi^{3+}$ substituent possesses the highest Lewis acidity among 2+/3+ ions,[16] with a $pK_a$ value of 1.58 much lower than that of $Sr^{2+}$ (13.18), $Ba^{2+}$ (13.36), $La^{3+}$ (9.06) and $Pr^{3+}$ (8.55).

Figure 1B:
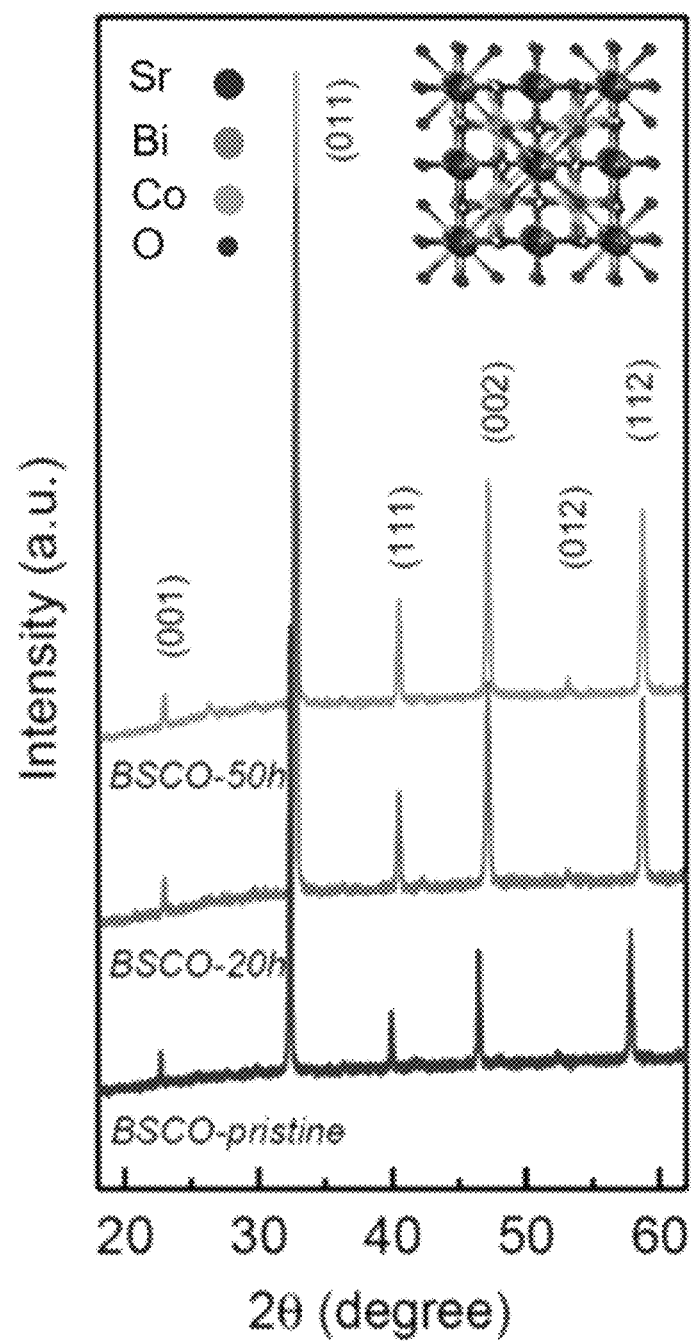
FIG. 1B is a powder X-ray diffraction (PXRD) pattern of a composition described herein.

$Bi_{0.2}Sr_{0.8}CoO_{3-\delta}$ was synthesized through a conventional solid-state route starting from $Bi_2O_3$, CoO and $SrCO_3$ precursors as detailed in Experimental Section. Higher levels of bismith substitution were not explored due to previously reported solubility limit of ~20%. See, for example, Knee, C. S.; Lindberg, F.; Khan, N.; Svensson, G.; Svedlindh, P.; Rundlof, H.; Eriksson, S. G.; Borjesson, L. Influence of Oxygen Defects on the Structure and Magnetic Properties of Sr1−xBixCoO3−y (0.1≤x≤0.2) Supercell Perovskites. Chem. Mater. 2006, 18, 1354-1364, which is incorporated by reference in its entirety. Refinement of the powder X-ray diffraction (PXRD) pattern (FIG. 1B) confirmed a cubic structure with Pm-3m space group and a unit cell parameter of 3.8955(1) Å (Table 1) which is basically identical to that reported in the original study (~3.9 Å)[17]. We can, therefore, assume that oxygen vacancy content ($\delta \approx 0.4$) and cobalt oxidation state (~+3) for $Bi_{0.2}Sr_{0.8}CoO_{3-\delta}$ measured in previous work should be comparable to that in our sample.

TABLE 1

Crystal structure and lattice parameters of $Bi_{0.2}Sr_{0.8}CoO_{3-\delta}$ in different charging states.

| Compound | Space Group | a (Å) |
| --- | --- | --- |
| pristine | Pm-3m | 3.8955(1) |
| C/20 | Pm-3m | 3.838 |
| C/50 | Pm-3m | 3.835 |

Figure 2A:
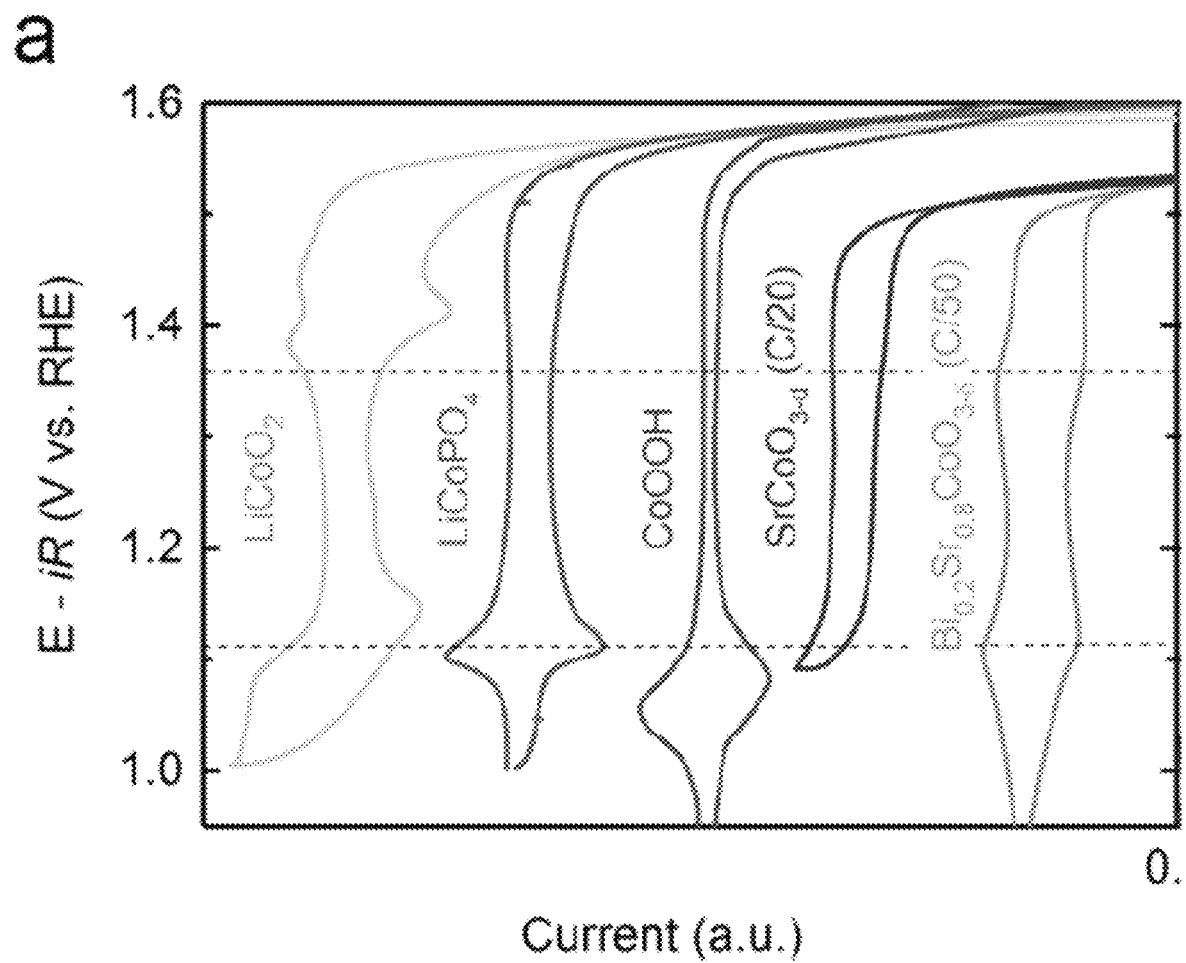
FIG. 2A is a graph depicting selected CV curves of Co-containing compounds measured in $O_2$-saturated 0.1 M or 1 M KOH with a scan rate of 10 mV s$^{-1}$.
Figure 2B:
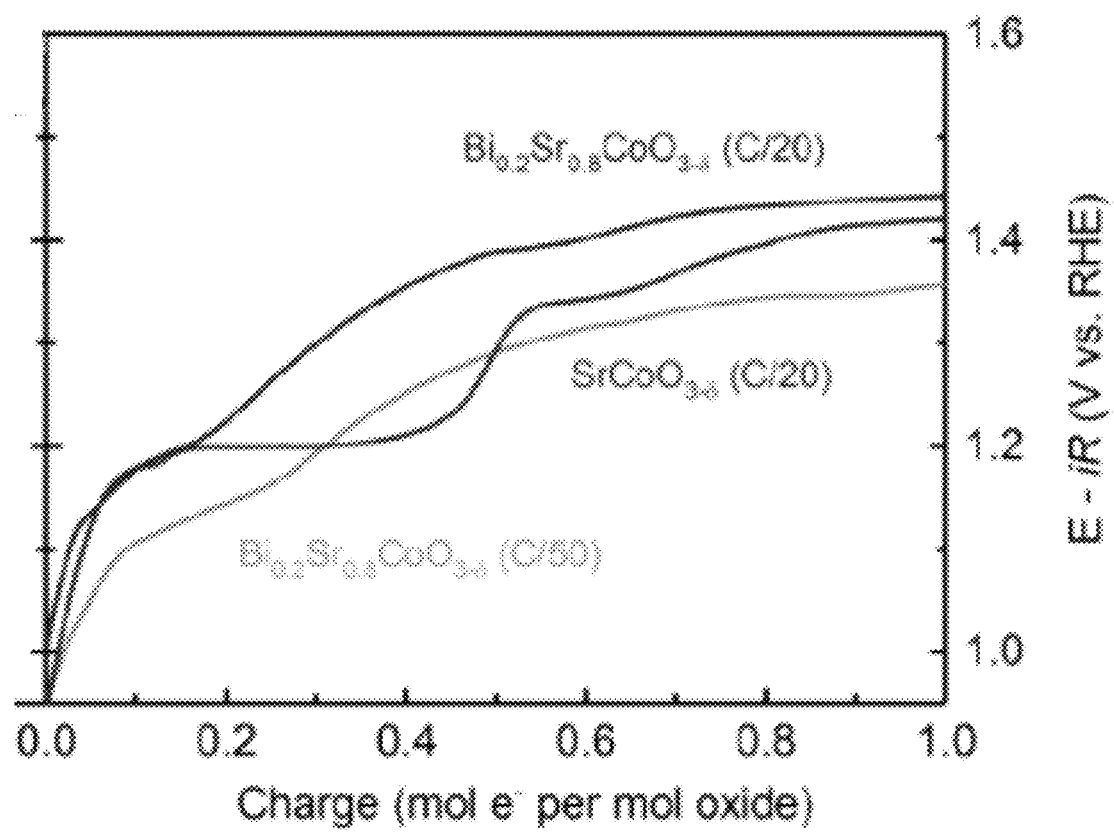
FIG. 2B is a graph depicting galvanostatic charging curves for $SrCoO_{3-\delta}$ and $Bi0.2Sr_{0.8}CoO_{3-\delta}$ (BSCO) recorded in $O_2$-saturated 1M KOH at rates C/20 and C/50.

Cyclic voltammetry curves of $Bi_{0.2}Sr_{0.8}CoO_{3-\delta}$ thin films cast on glassy carbon (GC) electrode in 1 M KOH exhibited two redox peaks at ~1.1 and ~1.4 V vs. RHE (FIG. 2A), which can be attributed to the $Co^{2+}/Co^{3+}$ redox couple found in $LiCoPO_4$ and $Co(OH)_2$[19], and $Co^{3+}/Co^{4+}$ for the ~1.4 V in $LiCoO_2$. See, for example, Nakayama, M.; Goto, S.; Uchimoto, Y.; Wakihara, M.; Kitajima, Y. Changes in Electronic Structure between Cobalt and Oxide Ions of Lithium Cobalt Phosphate as 4.8-V Positive Electrode Material. Chem. Mater. 2004, 16, 3399-3401; Burke, M. S.; Kast, M. G.; Trotochaud, L.; Smith, A. M.; Boettcher, S. W. Cobalt-Iron (Oxy)Hydroxide Oxygen Evolution Electrocatalysts: The Role of Structure and Composition on Activity, Stability, and Mechanism. J. Am. Chem. Soc. 2015, 137, 3638-3648; Mizushima, K.; Jones, P. C.; Wiseman, P. J.; Goodenough, J. B. LixCoO2 (0<x≤1): A New Cathode Material for Batteries of High Energy Density. Mater. Res. Bull. 1980, 15, 783-789; and Han, B.; Qian, D.; Risch, M.; Chen, H.; Chi, M.; Meng, Y. S.; Shao-Horn, Y. Role of LiCoO2 Surface Terminations in Oxygen Reduction and Evolution Kinetics. J. Phys. Chem. Lett. 2015, 6, 1357-1362, each of which is incorporated by reference in its entirety. These two redox processes were also clearly revealed in the galvanostatic data collected from $Bi_{0.2}Sr_{0.8}CoO_{3-\delta}$ thin films cast on GC in 1 M KOH, showing two sloppy plateaus centered at 1.1 and 1.3 V vs. RHE (FIG. 2B), which can be attributed to oxygen intercalation into $Bi_{0.2}Sr_{0.8}CoO_{3-\delta}$ (equivalent to ~0.8 electron per formula unit of $Bi_{0.2}Sr_{0.8}CoO_{3-\delta}$) similar to that found for $SrCoO_{3-\delta}$:

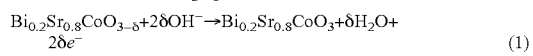

$$Bi_{0.2}Sr_{0.8}CoO_{3-\delta} + 2\delta OH^- \rightarrow Bi_{0.2}Sr_{0.8}CoO_3 + \delta H_2O + 2\delta e^- \quad (1)$$

The shape of the galvanostatic charging curve for $Bi_{0.2}Sr_{0.8}CoO_{3-\delta}$ is analogous to that for $La_{0.5}Sr_{0.5}CoO_{3-\delta}$ as both lacking the flat horizontal plateau corresponding to oxygen intercalation in $SrCoO_{3-\delta}$, assuming that charging curves can adopt various shapes depending on the specific chemistry. Interestingly, for $LaCoO_{3-\delta}$ ($\delta \approx 0$), unlike for the oxygen-deficient oxides, the potential almost immediately reaches the stable value corresponding to oxygen evolution, which is characteristic for materials with full oxygen stoichiometry. See, for example, Grimaud, A.; Diaz-Morales, O.; Han, B.; Hong, W. T.; Lee, Y.-L.; Giordano, L.; Stoerzinger, K. A.; Koper, M. T. M.; Shao-Horn, Y. Activating Lattice Oxygen Redox Reactions in Metal Oxides to Catalyse Oxygen Evolution. Nat. Chem. 2017, 9, 457-465, which is incorporated by reference in its entirety. The change of the cobalt oxidation state with retention of the structure is supported by XRD analysis of galvanostatically charged $Bi_{0.2}Sr_{0.8}CoO_{3-\delta}$ pellet electrodes (without carbon and Nafion binder) in FIG. 1B, which showed reduction in the lattice parameter for the cubic perovskite structure (a=3.838 Å, a=3.835 Å for $Bi_{0.2}Sr_{0.8}CoO_{3-\delta}$ C/20 and C/50 samples, respectively).

Cyclic voltammetry of $Bi_{0.2}Sr_{0.8}CoO_{3-\delta}$ before and after galvanostatically measurements at two current densities corresponding to transfer of 1 electron per formula unit over 20 hours (C/20) or 50 hours (C/50), show that $Bi_{0.2}Sr_{0.8}CoO_{3-\delta}$ samples after galvanostatic treatment (with lowered oxygen deficiency, $\delta$) had much greater OER activity than pristine $Bi_{0.2}Sr0.8CoO_{3-\delta}$, as shown in FIGS. 3A-3D. In addition, $Bi_{0.2}Sr_{0.8}CoO_{3-\delta}$ sample galvanostatically treated at C/50 had greater OER activity than that charged at C/20, indicating that higher Co valency and lower oxygen vacancy in this system lead to greater OER activity. We should note here that such trend is not universal and activity might not scale with the oxidation state of the metal site. For instance in case of bimetallic $ABO_3$ oxides, decrease of stability of the oxide upon deep oxidation of the metal site due to enhancement of A-O bond ionicity and leaching of $A^{n+}$ ions out to the solution may occur. See, for example, Grimaud, A.; May, K. J.; Carlton, C. E.; Lee, Y.-L.; Risch, M.; Hong, W. T.; Zhou, J.; Shao-Horn, Y. Double Perovskites as a Family of Highly Active Catalysts for Oxygen Evolution in Alkaline Solution. Nat. Commun. 2013, 4, 2439, which is incorporated by reference in its entirety. It was also shown there is an optimum $e_g$ orbitals filling rendering the highest activity for the oxide in OER, which scales non-linearly with the metal oxidation state. See, for example, Suntivich, J.; May, K. J.; Gasteiger, H. A.; Goodenough, J. B.; Shao-Horn, Y. A Perovskite Oxide Optimized for Oxygen Evolution Catalysis from Molecular Orbital Principles. Science 2011, 334, 1383-1385, which is incorporated by reference in its entirety. Also the coordination environment of the active site might affect the activity as the presence of cobalt in tetrahedral coordination environment $Co_{tetr}^{2+}$ in a catalyst precursor is beneficial for the increase of the catalytic activity. See, for example, Wang, H.-Y.; Hung, S.-F.; Chen, H.-Y.; Chan, T.-S.; Chen, H. M.; Liu, B. In Operando Identification of Geometrical-Site-Dependent Water Oxidation Activity of Spinel Co3O4. J. Am. Chem. Soc. 2016, 138 (1), 36-39; and Xu Lei; Jiang Qianqian; Xiao Zhaohui; Li Xingyue; Huo Jia; Wang Shuangyin; Dai Liming. Plasma-Engraved Co3O4 Nanosheets with Oxygen Vacancies and High Surface Area for the Oxygen Evolution Reaction. Angew. Chem. 2016, 128 (17), 5363-536, each of which is incorporated by reference in its entirety. In contrast to the latter reports, the activity of the $La_xSr_{1-x}CoO_{3-\delta}$ perovskites monotonically increases with increased oxidation state of cobalt. See, for example, Mefford, J. T.; Rong, X.; Abakumov, A. M.; Hardin, W. G.; Dai, S.; Kolpak, A. M.; Johnston, K. P.; Stevenson, K. J. Water Electrolysis on La1−xSrxCoO3−δ Perovskite Electrocatalysts. Nat. Commun. 2016, 7, 11053, which is incorporated by reference in its entirety. Altogether these studies demonstrate that effect of the oxygen vacancy and oxidation state of the active site is quite complicated and a universal descriptor is yet to be developed.

Figure 3A:
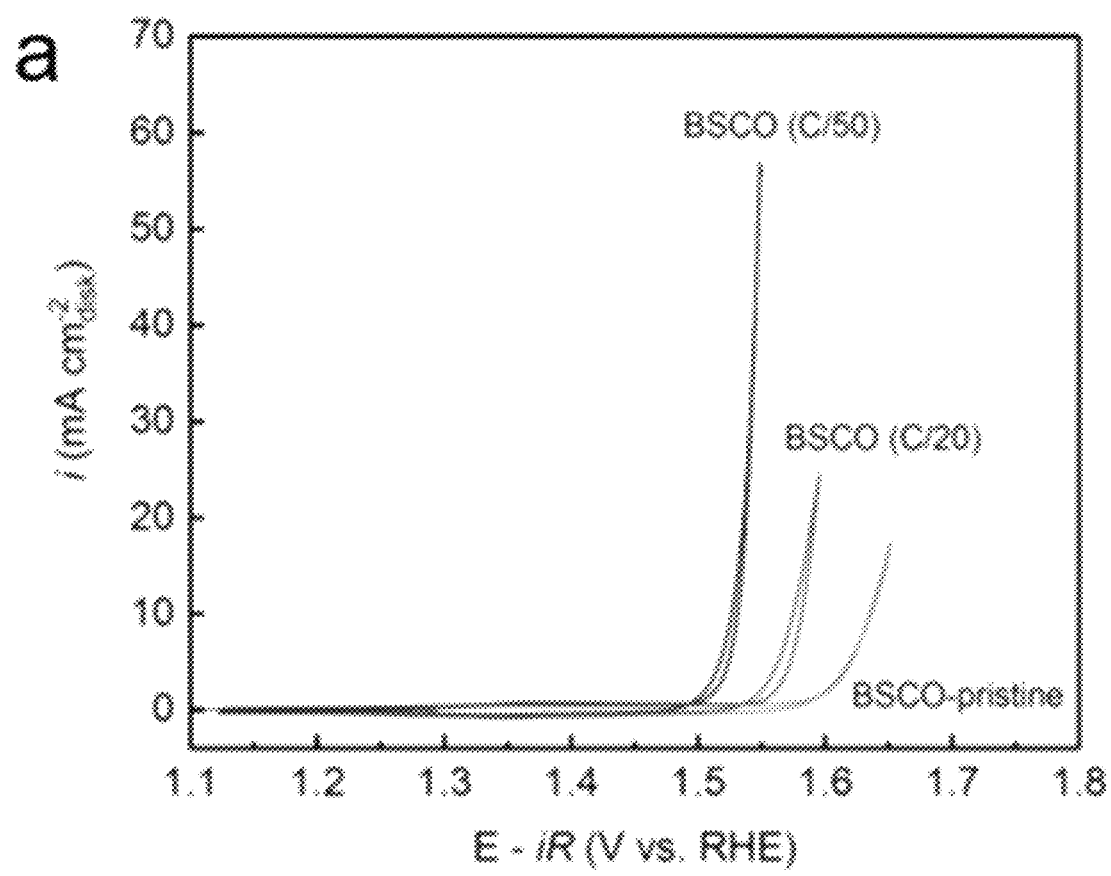
FIG. 3A is a graph depicting CV measurements ($2^{nd}$ scan, 10 mV s$^{-1}$) for $Bi_{0.2}Sr_{0.8}CoO_{3-\delta}$ (BSCO) oxides before and after galvanostatic charging. Galvanostatic experiments were performed for oxides films (containing Nafion and acetylene black carbon) supported on a glassy carbon electrode in $O_2$-saturated 1 M KOH electrolyte with an oxide loading of 0.25 mg$_{oxide}$ cm$^{-2}_{disk}$. BSCO-containing films were held at constant current density 6.1 mA g$^{-1}$ for 20 h (C/20), or at 2.4 mA g$^{-1}$ for 50 h (C/50), $SrCoO_{3-\delta}$-containing films were held at constant current density 7 mA g$^{-1}$ for 20 h (C/20). See, for example, Lee, Y.; Suntivich, J.; May, K. J.; Perry, E. E.; Shao-Horn, Y. Synthesis and Activities of Rutile $IrO_2$ and $RuO_2$ Nanoparticles for Oxygen Evolution in Acid and Alkaline Solutions. *J. Phys. Chem. Lett.* 2012, 3, 399-404, which is incorporated by reference in its entirety.
Figure 3B:
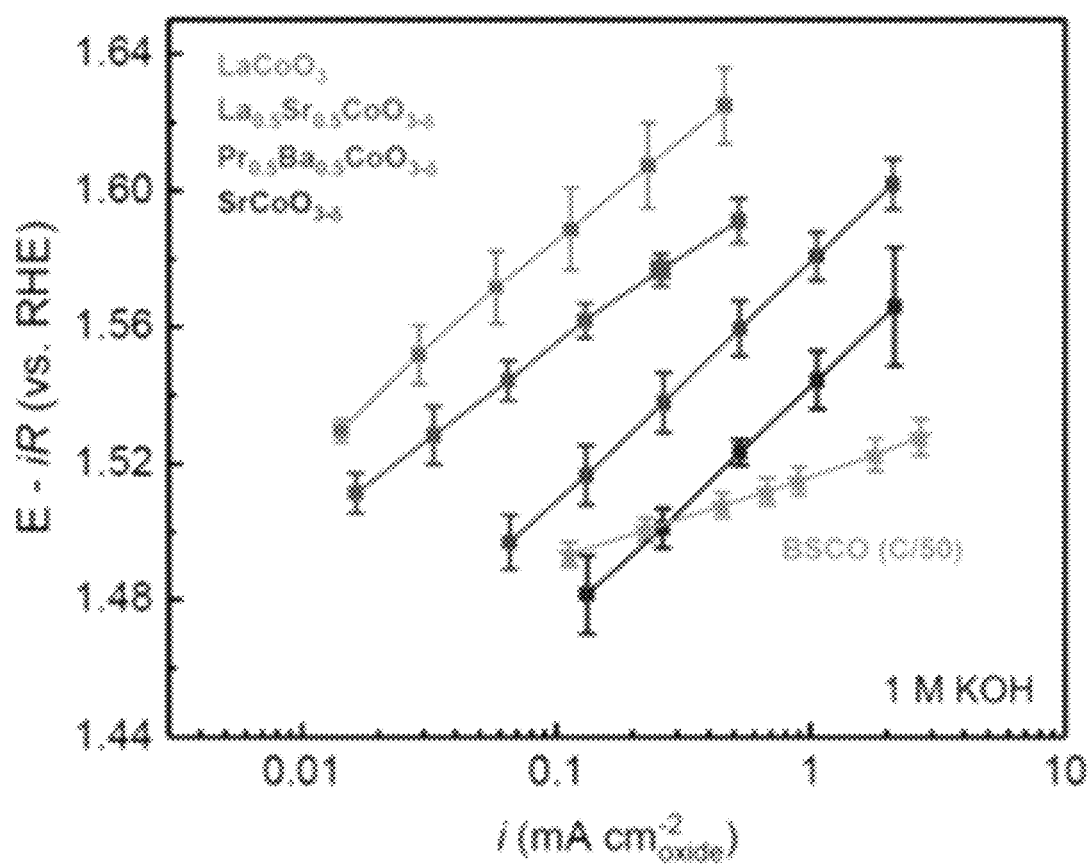
FIG. 3B is a graph depicting Tafel plots for selected perovskite oxides. Measurements were performed in $O_2$-saturated 0.1M KOH electrolyte with an oxide loading of 0.25 mg$_{oxide}$ cm$^{-2}_{disk}$. Data points were extracted from galvanostatic measurements. Data for $LaCoO_3$, $La_{0.5}Sr_{0.5}CO_{3-\delta}$, $Pr_{0.5}Ba_{0.5}CoO_{3-\delta}$, $SrCoO_{3-\delta}$ are taken from Grimaud, A.; Diaz-Morales, O.; Han, B.; Hong, W. T.; Lee, Y.-L.; Giordano, L.; Stoerzinger, K. A.; Koper, M. T. M.; Shao-Horn, Y. Activating Lattice Oxygen Redox Reactions in Metal Oxides to Catalyse Oxygen Evolution. *Nat. Chem.* 2017, 9, 457-465, which is incorporated by reference in its entirety.
Figure 7:
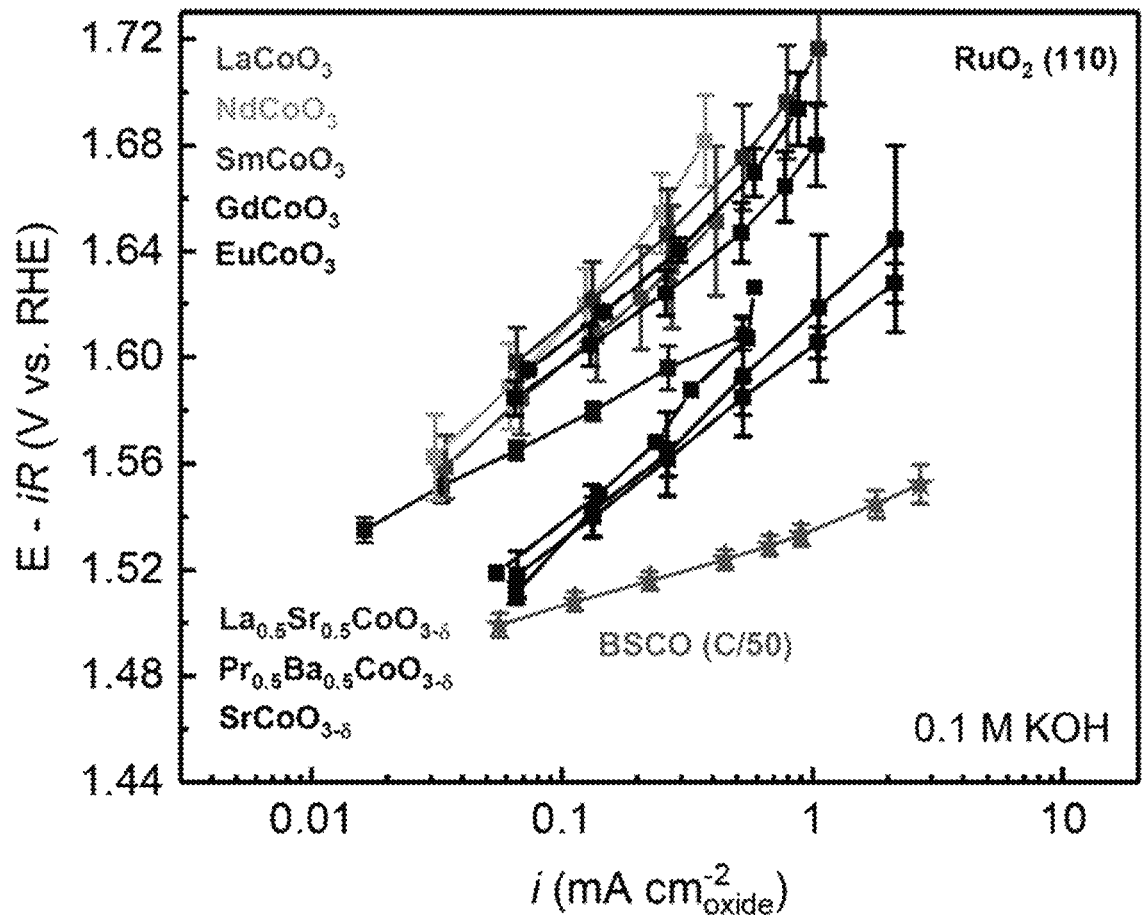
FIG. 7 is a graph depicting OER Tafel plots for selected perovskite oxides and $RuO_2$. Measurements were performed in $O_2$-saturated 0.1 M KOH electrolyte with an oxide loading of 0.25 $mg_{oxide}\ cm^{-2}_{disk}$ for perovskites. Data points were extracted from galvanostatic measurements. Data for $La_{0.5}Sr_{0.5}CoO_{3-\delta}$, $Pr_{0.5}Ba_{0.5}CoO_{3-\delta}$, $SrCoO_{3-\delta}$ are taken from Grimaud, A.; Diaz-Morales, O.; Han, B.; Hong, W. T.; Lee, Y.-L.; Giordano, L.; Stoerzinger, K. A.; Koper, M. T. M.; Shao-Horn, Y. Activating Lattice Oxygen Redox Reactions in Metal Oxides to Catalyse Oxygen Evolution. *Nat. Chem.* 2017, 9, 457-465, which is incorporated by reference in its entirety, and for $RuO_2$ taken from Stoerzinger, K. A.; Rao, R. R.; Wang, X. R.; Hong, W. T.; Rouleau, C. M.; Shao-Horn, Y. The Role of Ru Redox in pH-Dependent Oxygen Evolution on Rutile Ruthenium Dioxide Surfaces. *Chem* 2017, 2, 668-675, which is incorporated by reference in its entirety.

As the contributions from oxide reduction and oxidation in bulk cannot be excluded completely from OER currents extracted from the cyclic voltammetry data, OER activity of $Bi_{0.2}Sr_{0.8}CoO_{3-\delta}$ after galvanostatic charging for 50 hrs in 0.1 M and 1 M KOH was assessed through galvanostatical measurements, from which the specific activity normalized to the BET oxide surface area is shown in FIGS. 7 and 3B. See Table 2.

TABLE 2

BET surface area and corresponding charging currents of $Bi_{0.2}Sr_{0.8}CoO_{3-\delta}$

| BET ($m^2$/g) | C/20 (mA/$cm^2$) | C/50 (mA/$cm^2$) | C/20 (mA/g) | C/50 (mA/g) |
| --- | --- | --- | --- | --- |
| 0.36 | 17.1 | 42.8 | 6.1 | 2.4 |

The specific OER activity of galvanostatically charged $Bi_{0.2}Sr_{0.8}CoO_{3-\delta}$ ($\delta \approx 0$, C/50) is much higher than that of $RuO_2$ (110) considered as a gold standard for OER, $LaCoO_3$, $La_{0.5}Sr_{0.5}CoO_3$ and $Pr_{0.5}Ba_{0.5}CoO_{3-\delta}$ in 0.1 M (FIG. 7) and 1 M KOH (FIG. 3B). In addition, galvanostatically charged $Bi_{0.2}Sr_{0.8}CoO_{3-\delta}$ ($\delta \approx 0$, C/50) was found to have an exceptionally low Tafel slope of ~25 mV decade$^{-1}$ compared to all reported OER catalysts including $SrCoO_{3-\delta}$ (60 mV/decade) showing record OER activity and rendering unpredecented OER activity at high current densities. A Tafel slope of 2.303 RT/$\alpha$F (~120 mV decade$^{-1}$ by assuming $\alpha$=0.5) is expected for one electron transfer. See, for example, Doyle, R. L.; Lyons, M. E. G. The Oxygen Evolution Reaction: Mechanistic Concepts and Catalyst Design. In *Photoelectrochemical Solar Fuel Production: From Basic Principles to Advanced Devices*; Giménez, S., Bisquert, J., Eds.; Springer International Publishing, 2016; pp 41-104, which is incorporated by reference in its entirety. Although it is difficult to extract the OER machanism based on the Tafel slope$^{29}$, low Tafel slopes can indicate a rate determining step close to the end of the catalytic reaction sequence. See, for example, Shinagawa, T.; Garcia-Esparza, A. T.; Takanabe, K. Insight on Tafel Slopes from a Microkinetic Analysis of Aqueous Electrocatalysis for Energy Conversion. *Sci. Rep.* 2015, 5, 13801; and Suen, N.-T.; Hung, S.-F.; Quan, Q.; Zhang, N.; Xu, Y.-J.; Chen, H. M. Electrocatalysis for the Oxygen Evolution Reaction: Recent Development and Future Perspectives. *Chem. Soc. Rev.* 2017, 46, 337-365, each of which is incorporated by reference in its entirety. Moreover, $Bi_{0.2}Sr_{0.8}CoO_{3-\delta}$ had pH-dependent OER activity (FIG. 3C), where the OER activity increased with increasing pH. It is worth mentioning that at 1.55 V vs. RHE, $Bi_{0.2}Sr_{0.8}CoO_{3-\delta}$ exhibits OER currents one order of magnitude higher than $SrCoO_{3-\delta}$ at all pHs examined (FIG. 3D), highlighting the positive role of $Bi^{3+}$ substitution on OER activity. Comparing with $La_{0.2}Sr_{0.8}CoO_{3-\delta}$, $Bi^{3+}$ is characterized by a much higher Lewis acidity compared to $La^{3+}$ ($pK_a$ values for hydrated ions are 1.58 and 9.06 for $Bi^{3+}$ and $La^{3+}$, respectively) resulting in a significant increase of OER activity, which can be attributed to optimized binding of OER reaction intermediates and/or facilitated deprotonation kinetics. See, for example, Mefford, J. T.; Rong, X.; Abakumov, A. M.; Hardin, W. G.; Dai, S.; Kolpak, A. M.; Johnston, K. P.; Stevenson, K. J. Water Electrolysis on La1−xSrxCoO3−δ Perovskite Electrocatalysts. *Nat. Commun.* 2016, 7, 11053; and Dean, J. A.; Lange, N. A. Lange's Handbook of Chemistry; Lange's Handbook of Chemistry; McGraw-Hill, 1999, each of which is incorporated by reference in its entirety. Similar enhanced OER kinetics have been also observed for $LnNiO_3$ perovskites upon substitution of $La^{3+}$ with more acidic $Gd^{3+}$ and $Eu^{3+}$. It should be noted that the inductive effect on the OER activity for the relatively low active $LnCoO_3$ (Ln=La, Nd, Gd, Sm, Eu), where the OER activity is limited by electron transfer, was not evident considering the experimental error (FIG. 7). See, for example, Hong, W. T.; Welsch, R. E.; Shao-Horn, Y. Descriptors of Oxygen-Evolution Activity for Oxides: A Statistical Evaluation. *J. Phys. Chem. C* 2016, 120, 78-86; and Hong, W. T.; Stoerzinger, K. A.; Lee, Y.-L.; Giordano, L.; Grimaud, A.; Johnson, A. M.; Hwang, J.; Crumlin, E. J.; Yang, W.; Shao-Horn, Y. Charge-Transfer-Energy-Dependent Oxygen Evolution Reaction Mechanisms for Perovskite Oxides. *Energy Environ. Sci.* 2017, 10, 2190-2200, each of which is incorporated by reference in its entirety.

Figure 3C:
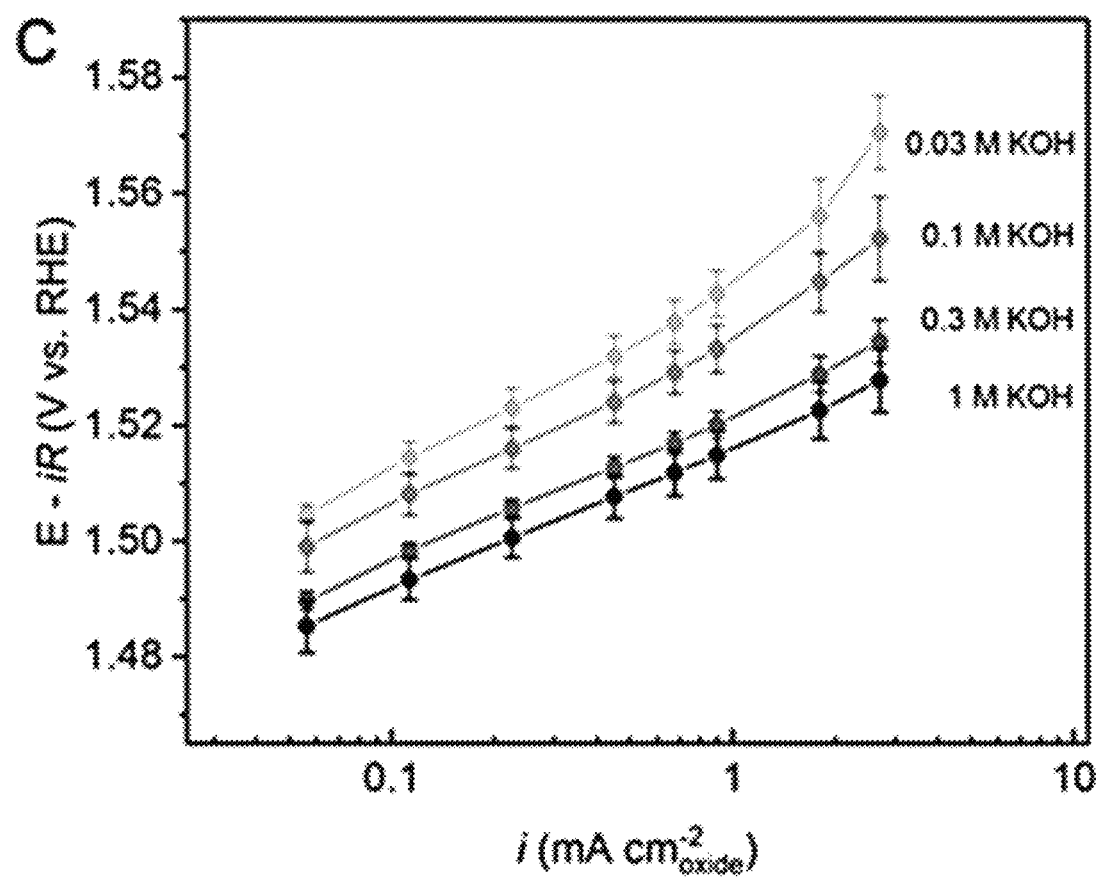
FIG. 3C is a graph depicting pH dependence of OER activity from galvanostatic measurements for the BSCO-containing films charged at C/50. Error bars represent standard deviation from at least 3 independent measurements as shown in ESI (FIGS. 9 and 10).
Figure 3D:
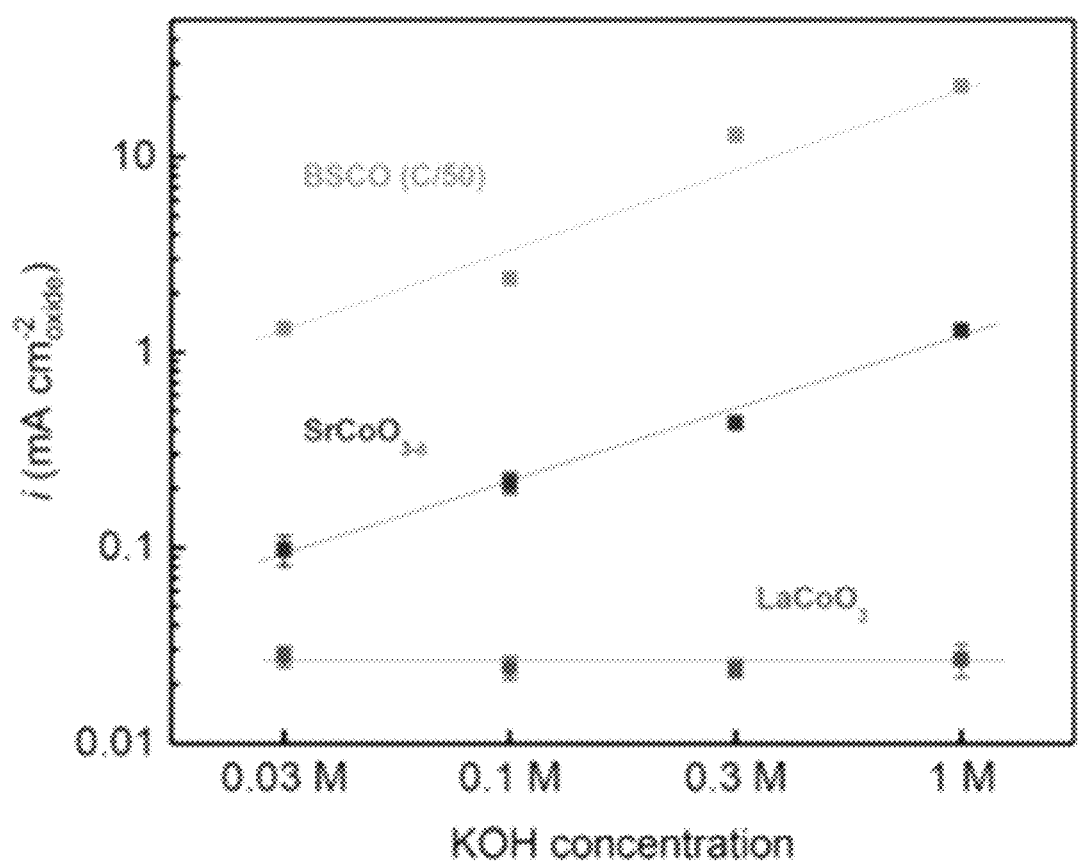
FIG. 3D is a graph depicting specific OER activity at 1.55 V vs. RHE as a function of pH measured for glassy carbon electrodes with oxide loading 0.25 mg$_{oxide}$ cm$^{-2}_{disk}$.
Figure 4A:
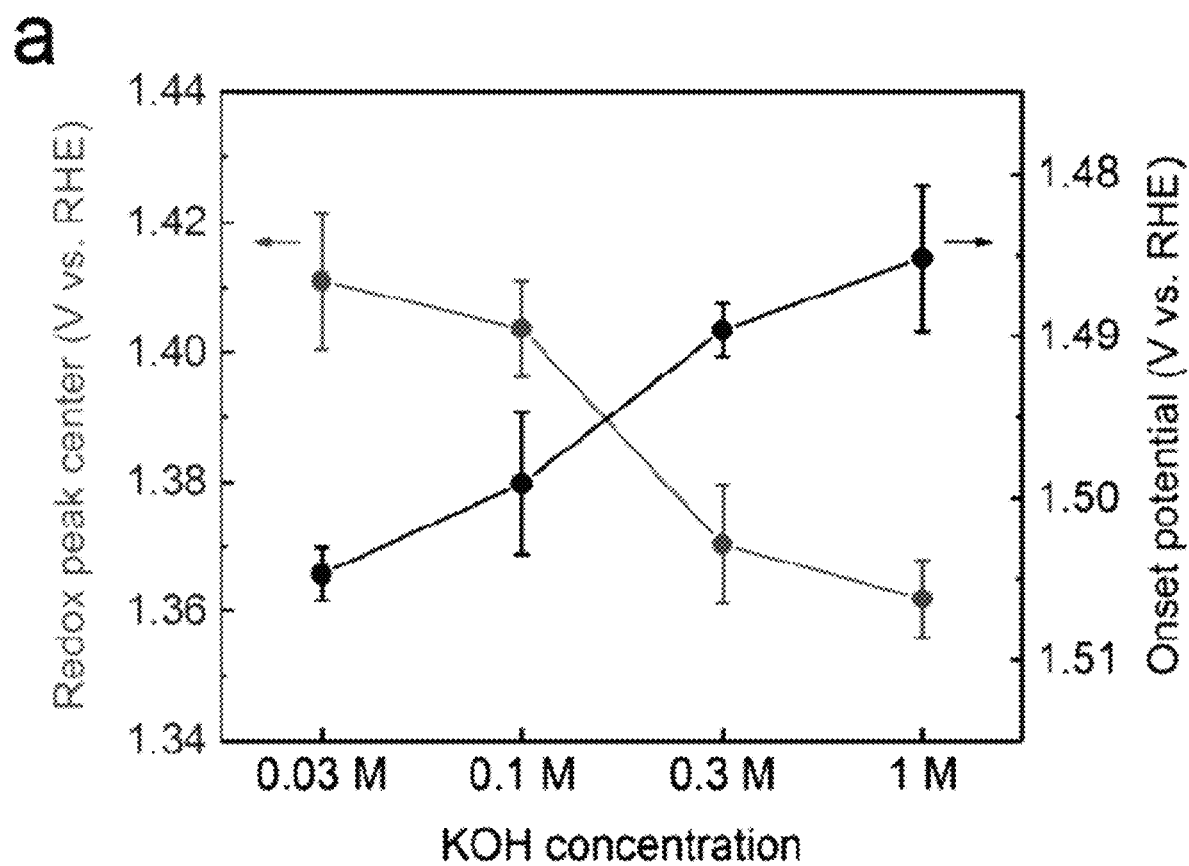
FIG. 4A is a graph depicting position of the average redox peak center prior to OER (left, red) and OER onset potential (right, blue) estimated as a potential required to achieve ~60 $\mu A\ cm_{oxide}^{-2}$ OER current as assessed from Tafel plots from galvanostatic measurements for BSCO (C/50) sample as a function of the electrolyte concentration.
Figure 4B:
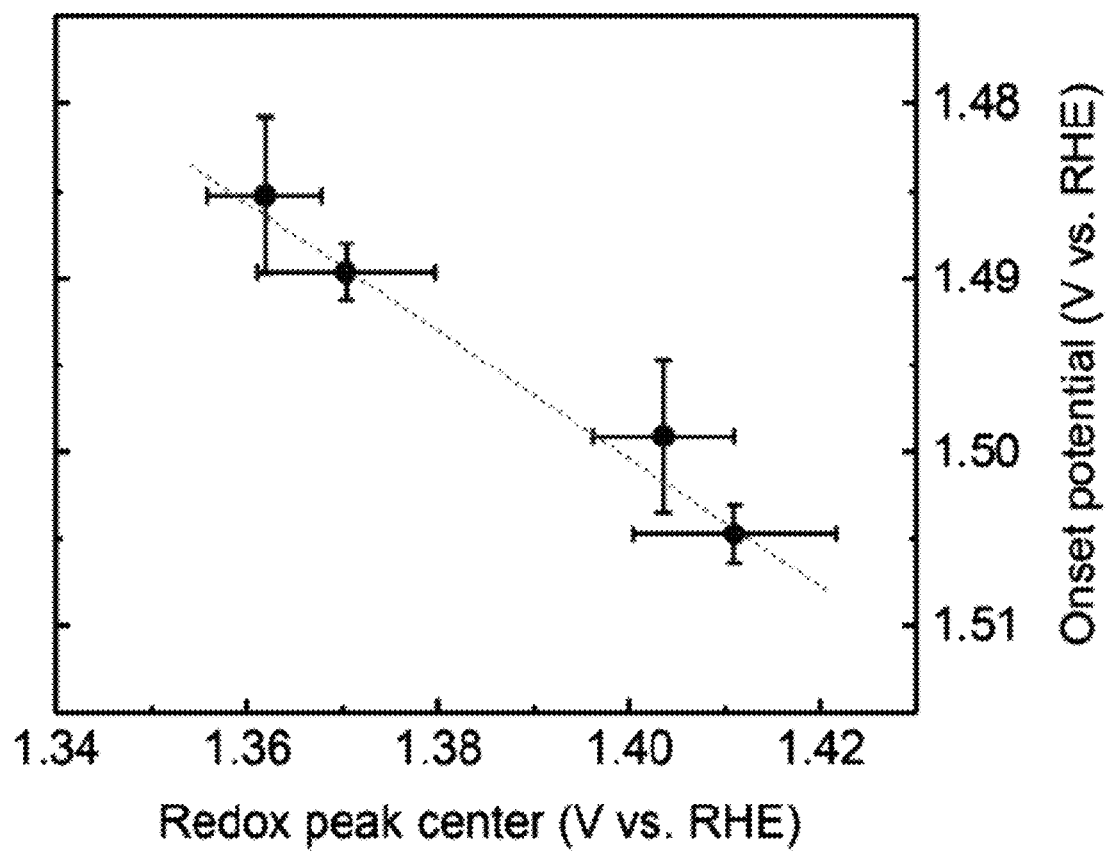
FIG. 4B is a graph depicting relationship between onset potential (measured at 60 $\mu A\ cm_{oxide}^{-2}$ OER current) and position of the average redox peak center prior to OER for the BSCO (C/50) sample. CV measurements at different electrolyte concentrations were performed for the oxides films which were galvanostatically charged in $O_2$-saturated 1 M KOH electrolyte with an oxide loading of 0.25 $mg_{oxide}\ cm^{-2}_{disk}$.

The redox peak of $Bi_{0.2}Sr_{0.8}CoO_{3-\delta}$ prior to OER was found to shift negatively with increasing pH (~−40 mV/pH), as shown in FIG. 3C. Similar shifts were found for Ni—Fe oxyhydroxides (up to −60 mV/pH), (111), (001), (101) $RuO_2$ surfaces (up to −27 mV/pH) and (110) $IrO_2$ surface (−7.5 mV/pH) for the pre-OER redox peak. See, for example, Görlin, M.; Ferreira de Aranjo, J.; Schmies, H.; Bernsmeier, D.; Dresp, S.; Gliech, M.; Jusys, Z.; Chernev, P.; Kraehnert, R.; Dau, H.; et al. Tracking Catalyst Redox States and Reaction Dynamics in NiFe Oxyhydroxide Oxygen Evolution Reaction Electrocatalysts: The Role of Catalyst Support and Electrolyte PH. *J. Am. Chem. Soc.* 2017, 139, 2070-2082; Stoerzinger, K. A.; Rao, R. R.; Wang, X. R.; Hong, W. T.; Rouleau, C. M.; Shao-Horn, Y. The Role of Ru Redox in pH-Dependent Oxygen Evolution on Rutile Ruthenium Dioxide Surfaces. *Chem* 2017, 2, 668-675; and Kuo, D. Y.; Kawasaki, J. K.; Nelson, J. N.; Kloppenburg, J.; Hautier, G.; Shen, K. M.; Schlom, D. G.; Suntivich, J. Influence of Surface Adsorption on the Oxygen Evolution Reaction on IrO2(110). *J. Am. Chem. Soc.* 2017, 139, 3473-3479, each of which is incorporated by reference in its entirety. The position of pre-OER redox feature (FIGS. 4A-4B) on RHE scale shifts positively with decreasing pH (non-Nernstian shift) implying pH-dependent binding of the reaction intermediates, which can be attributed to the oxide/water interface structure changes at different pH or noninteger number of electrons transferred during this reaction step. See, for example, Watanabe, E.; Rossmeisl, J.; Björketun, M. E.; Ushiyama, H.; Yamashita, K. Atomic-Scale Analysis of the RuO2/Water Interface under Electrochemical Conditions. *J. Phys. Chem. C* 2016, 120, 8096-8103; Schwarz, K.; Xu, B.; Yan, Y.; Sundararaman, R. Partial Oxidation of Step-Bound Water Leads to Anomalous PH Effects on Metal Electrode Step-Edges. *Phys. Chem. Chem. Phys.* 2016, 18 (24), 16216-16223; and van der Niet, M. J. T. C.; Garcia-Araez, N.; Hernandez, J.; Feliu, J. M.; Koper, M. T. M. Water Dissociation on Well-Defined Platinum Surfaces: The Electrochemical Perspective. *Catal. Today* 2013, 202, 105-113, each of which is incorporated by reference in its entirety.

The pH dependence of activity (FIGS. 3C and 3D) is similar to that reported for $SrCoO_{3-\delta}$ recently, which cannot be explained by the conventional OER mechanism involving four concerted proton-coupled electron transfer steps, yielding pH-independence of OER activity. In contrast, less active catalysts such as $LaCoO_3$ exhibit pH-independent OER activity and may then follow the conventional OER mechanism. See, for example, Rossmeisl, J.; Qu, Z.-W.; Zhu, H.; Kroes, G.-J.; Norskov, J. K. Electrolysis of Water on Oxide Surfaces. *J. Electroanal. Chem.* 2007, 607, 83-89; Rossmeisl, J.; Logadottir, A.; Norskov, J. K. Electrolysis of Water on (Oxidized) Metal Surfaces. *Chem. Phys.* 2005, 319, 178-184.; Goodenough, J. B.; Manoharan, R.; Paranthaman, M. Surface Protonation and Electrochemical Activity of Oxides in Aqueous Solution. *J. Am. Chem. Soc.* 1990, 112, 2076-2082, each of which is incorporated by reference in its entirety. Such pH-dependent OER activity (which may be not captured in the computational OER mechanism assuming four proton-coupled electron transfer steps) can be attributed to having either partially charged reaction intermediates or a surface deprotonation involved in the rate-limiting step or in a chemical step preceeding the rate limiting step. See, for example, Man, I. C.; Su, H.-Y.; Calle-Vallejo, F.; Hansen, H. A.; Martinez, J. I.; Inoglu, N. G.; Kitchin, J.; Jaramillo, T. F.; Norskov, J. K.; Rossmeisl, J. Universality in Oxygen Evolution Electrocatalysis on Oxide Surfaces. *ChemCatChem* 2011, 3, 1159-1165; and Giordano, L.; Han, B.; Risch, M.; Hong, W. T.; Rao, R. R.; Stoerzinger, K. A.; Shao-Horn, Y. pH Dependence of OER Activity of Oxides: Current and Future Perspectives. *Catal. Today* 2016, 262, 2-10, each of which is incorporated by reference in its entirety. For instance, the pH dependence of activity of Ni—Fe oxyhydroxides has been proposed to be originated from non-concerted metal oxidation coupled with surface hydroxides deprotonation leading to formation of negatively charged intermediates. See, for example, Görlin, M.; Ferreira de Aranjo, J.; Schmies, H.; Bernsmeier, D.; Dresp, S.; Gliech, M.; Jusys, Z.; Chernev, P.; Kraehnert, R.; Dau, H.; et al. Tracking Catalyst Redox States and Reaction Dynamics in NiFe Oxyhydroxide Oxygen Evolution Reaction Electrocatalysts: The Role of Catalyst Support and Electrolyte PH. *J. Am. Chem. Soc.* 2017, 139, 2070-2082, which is incorporated by reference in its entirety. Interestingly, for $RuO_2$ the different crystal orientations are affected differently by pH. Whereas the less active (110) and (100) exhibits a pH-independent OER activity, the (101), (001) and (111) orientations have pH-dependent ruthenium oxidation and OER kinetics, which could be due to different extent of OER intermediate stabilization (for example via H-bonding interactions) at varying pHs. See, for example, Rao, R. R.; Kolb, M. J.; Halck, N. B.; Pedersen, A. F.; Mehta, A.; You, H.; Stoerzinger, K. A.; Feng, Z.; Hansen, H. A.; Zhou, H.; et al. Towards Identifying the Active Sites on RuO2(110) in Catalyzing Oxygen Evolution. *Energy Environ. Sci.* 2017, 10, 2626-2637, which is incorporated by reference in its entirety.

For $Bi_{0.2}Sr_{0.8}CoO_{3-\delta}$, given that pre-OER redox process includes proton transfer and taking into account recent reports attributing peak around 1.4 V vs RHE for cobalt-based oxides to a surface hydroxide deprotonation coupled with metal oxidation, the potential of the pre-OER redox feature might correspond to the thermodynamic potential of the reaction of surface hydroxide deprotonation coupled with metal redox, as represented in Eqn 2 below (see, for example, hang, M.; de Respinis, M.; Frei, H. Time-Resolved Observations of Water Oxidation Intermediates on a Cobalt Oxide Nanoparticle Catalyst. *Nat. Chem.* 2014, 6, 362; and Gerken, J. B.; McAlpin, J. G.; Chen, J. Y. C.; Rigsby, M. L.; Casey, W. H.; Britt, R. D.; Stahl, S. S. Electrochemical Water Oxidation with Cobalt-Based Electrocatalysts from pH 0-14: The Thermodynamic Basis for Catalyst Structure, Stability, and Activity. *J. Am. Chem. Soc.* 2011, 133, 14431-14442, each of which is incorporated by reference in its entirety):

$$[M^{n+}\text{-OH}]+OH^- \rightarrow [M^{n+1}\text{-O}]+H_2O+e^- \quad (2)$$

The Gibbs free energy (or the measured potential) of this reaction:
$\Delta G_1 = \Delta G(M^{n+1}\text{-O}) - \Delta G(M^{n+}\text{-OH}) - eU + \Delta G_f(H_2O) - \Delta G_f(OH^-) = \Delta G_{O^*} - \Delta G_{HO^*} - eU + \text{const}$, therefore represents the universal OER activity descriptor proposed by Man, Rossmeisl et al. (see, Man, I. C.; Su, H.-Y.; Calle-Vallejo, F.; Hansen, H. A.; Martinez, J. I.; Inoglu, N. G.; Kitchin, J.; Jaramillo, T. F.; Norskov, J. K.; Rossmeisl, J. Universality in Oxygen Evolution Electrocatalysis on Oxide Surfaces. *ChemCatChem* 2011, 3, 1159-1165, which is incorporated by reference in its entirety). Therefore, taking into account the linear relationship between binding energies of surface-bound *OH and *OOH species ($\Delta E_{OOH} - \Delta E_{OH} = 3.2$ eV) (which are independent of potential and only describe the interaction between the oxygen intermediates and oxide surfaces), and assuming that eqn 2 correctly describes the chemistry of redox event giving rise to a redox feature prior to OER onset for $Bi_{0.2}Sr_{0.8}CoO_{3-\delta}$ oxide, the measured potential of this redox can correspond to the activity descriptor $\Delta G_{O^*} - \Delta G_{HO^*}$ proposed earlier, being the experimental evidence for the theoretically deduced trends. See, for example, Man, I. C.; Su, H.-Y.; Calle-Vallejo, F.; Hansen, H. A.; Martinez, J. I.; Inoglu, N. G.; Kitchin, J.; Jaramillo, T. F.; Norskov, J. K.; Rossmeisl, J. Universality in Oxygen Evolution Electrocatalysis on Oxide Surfaces. *ChemCatChem* 2011, 3, 1159-1165, which is incorporated by reference in its entirety.

Figure 5A:
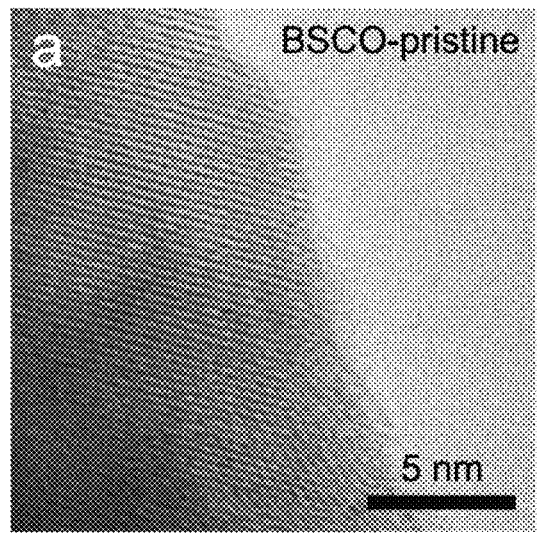
FIG. 5A is a TEM image of pristine $Bi_{0.2}Sr_{0.8}CoO_{3-\delta}$ (BSCO) powder.
Figure 5B:
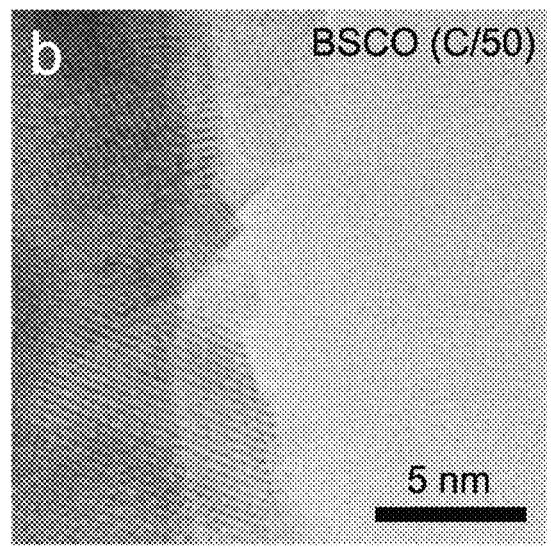
FIG. 5B is a TEM image of BSCO deposited from ink, galvanostatically treated at 2.4 mA/g for 50 h and followed by OER measurements.
Figure 5C:
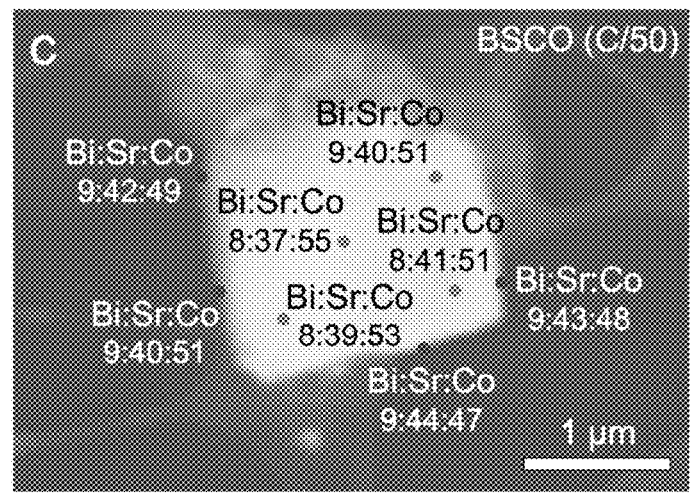
FIG. 5C is a TEM image of Representative high angular annular dark field (HAADF) imaging and scanning TEM energy dispersive spectroscopy (STEM-EDX) of BSCO particles after galvanostatic charging and OER measurements. Quantification of the EDX results is shown on the HAADF images. More EDX results are shown in FIG. 13.
Figure 5D:
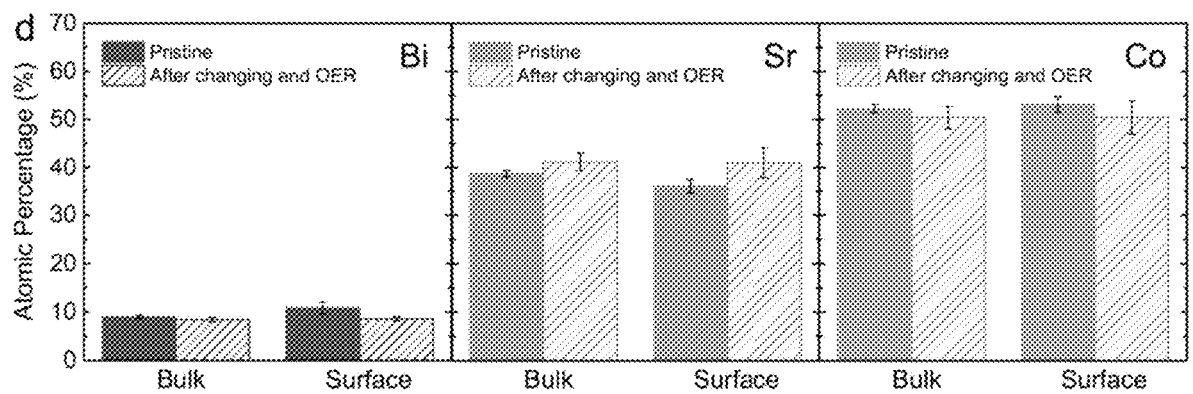
FIG. 5D is a graph depicting bulk and surface Bi, Sr and Co metal composition in BSCO before and after charging and OER measurements as determined by EDX. The error bars in (d) represent the standard deviation of at least eight spots.
Figure 8:
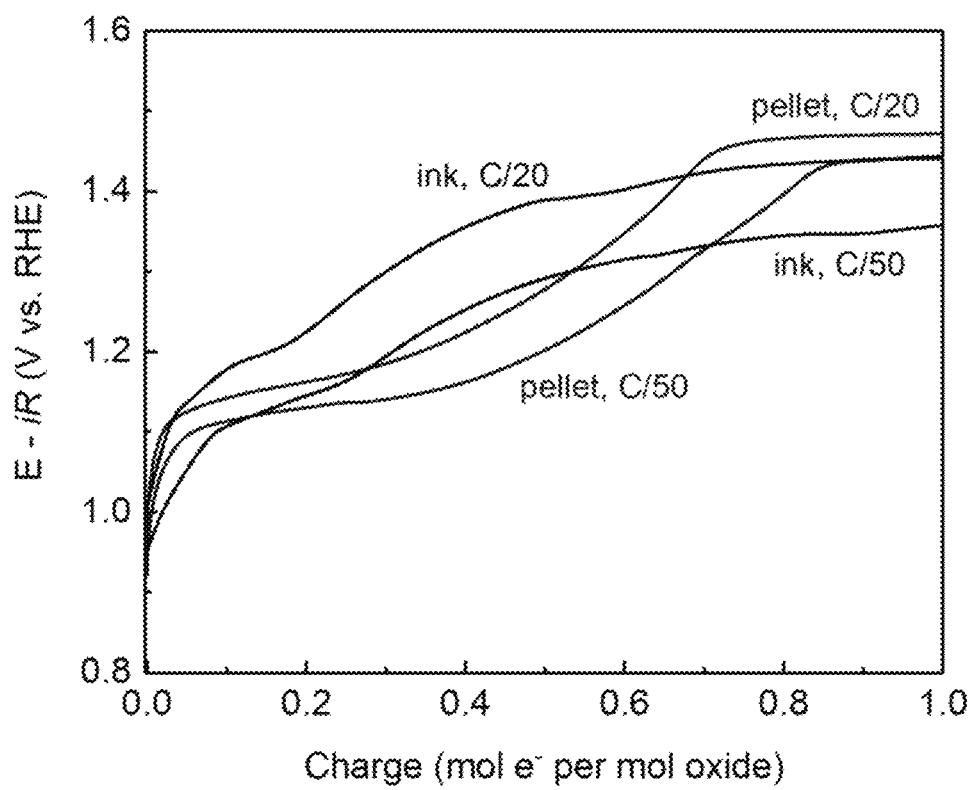
(FIG. 8). Galvanostatic experiments were performed for oxides films containing Nafion and acetylene black carbon supported on a glassy carbon electrode in $O_2$-saturated 1 M KOH electrolyte with an oxide loading of 0.25 $mg_{oxide}\ cm^{-2}_{disk}$.
Figure 9:
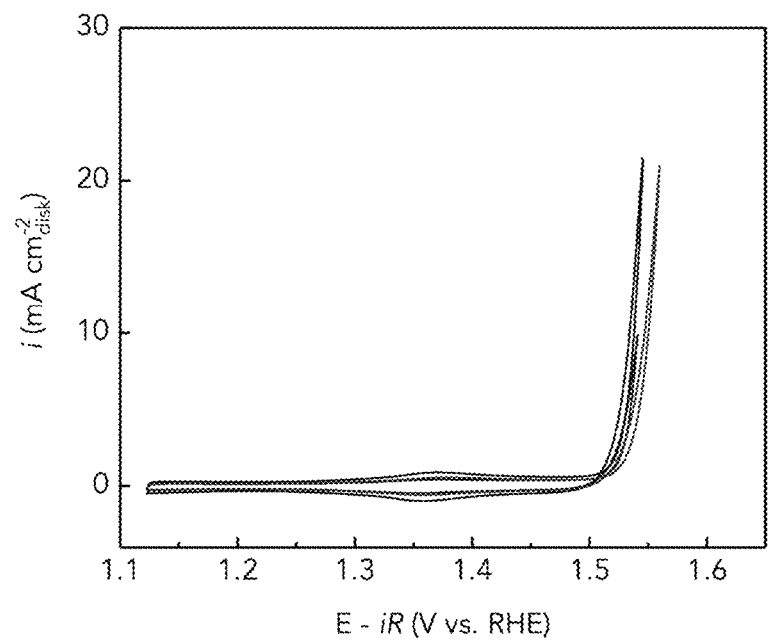
FIG. 9 is a graph depicting representative independent CV and galvanostatic experiments for $Bi_{0.2}Sr_{0.8}CoO_{3-\delta}$ electrode preliminary held at constant current density 2.4 mA $g^{-1}$ for 50 h (C/50) in $O_2$-saturated 1 M KOH. Experiments were performed for oxides films containing Nafion and acetylene black carbon supported on a glassy carbon electrode in $O_2$-saturated 1 M KOH electrolyte with an oxide loading of 0.25 $mg_{oxide}\ cm^{-2}_{disk}$.
Figure 9:
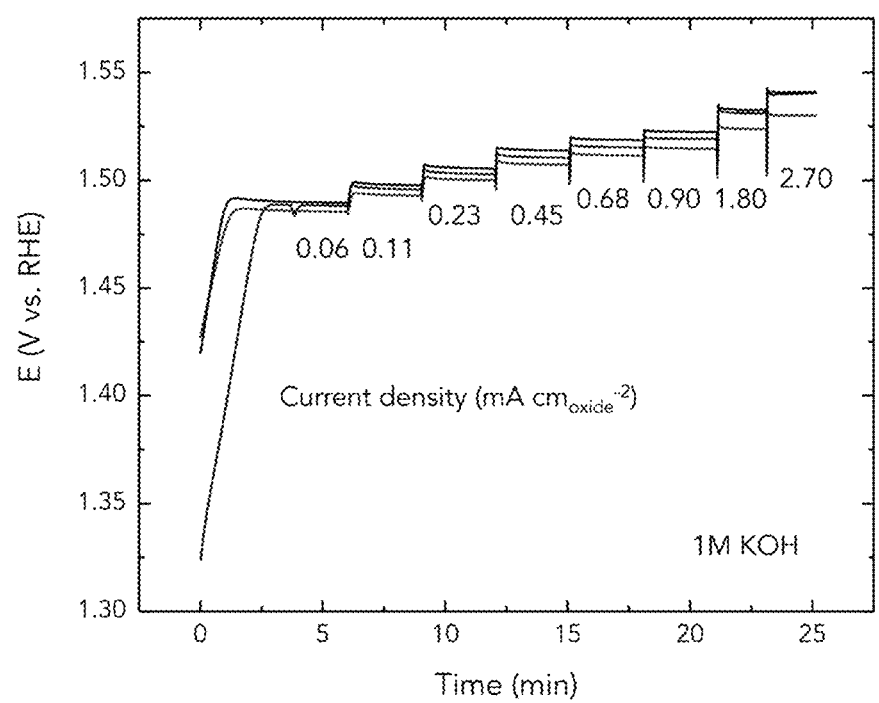
Figure 10:
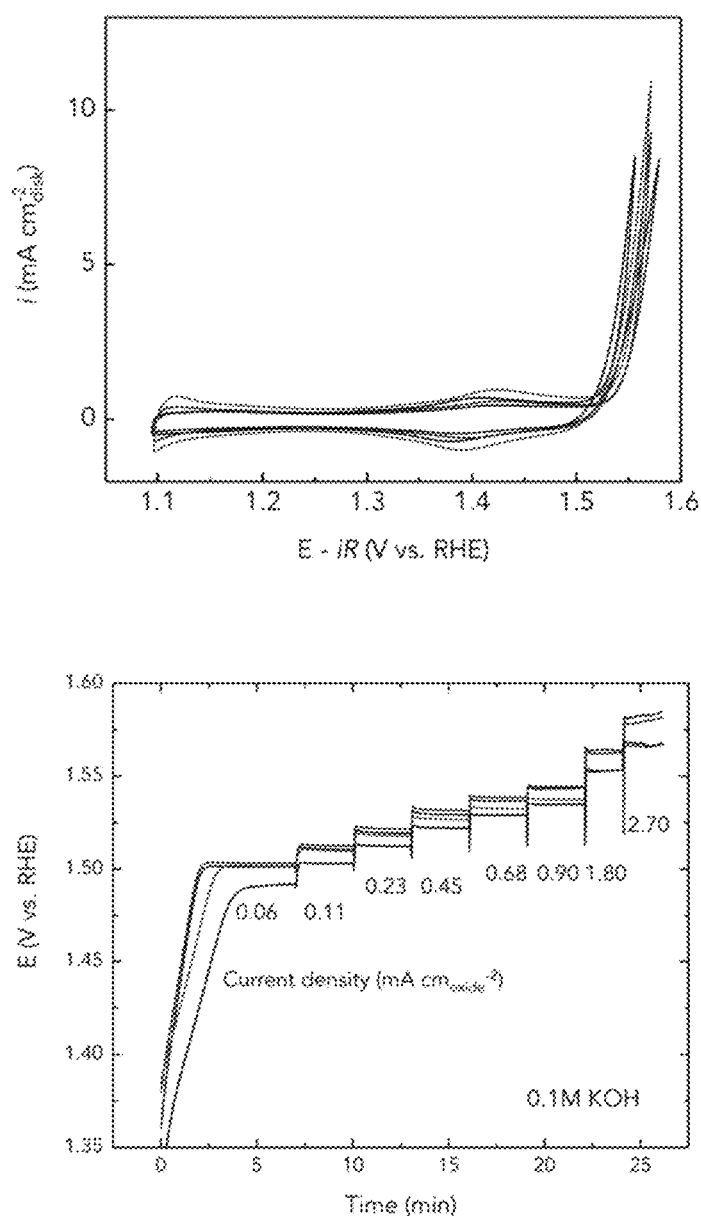
FIG. 10 is a graph depicting representative independent CV and galvanostatic experiments for $Bi_{0.2}Sr_{0.8}CoO_{3-\delta}$ electrode preliminary held at constant current density 2.4 mA $g^{-1}$ for 50 h (C/50) in $O_2$-saturated 1 M KOH. Experiments were performed for oxides films containing Nafion and acetylene black carbon supported on a glassy carbon electrode in $O_2$-saturated 0.1 M KOH electrolyte with an oxide loading of 0.25 $mg_{oxide}\ cm^{-2}_{disk}$.
Figure 12:
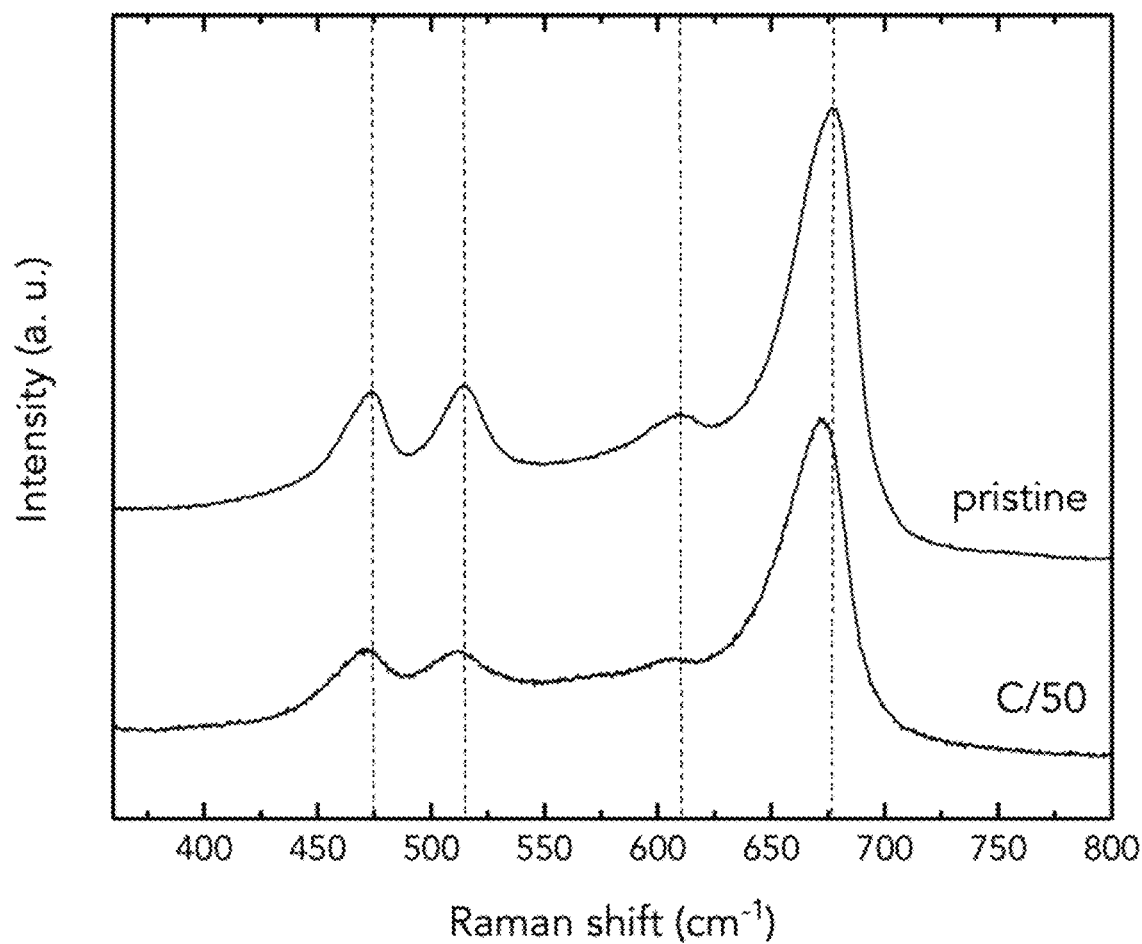
FIG. 12 is a graph depicting Raman spectra of pristine $Bi_{0.2}Sr_{0.8}CoO_{3-\delta}$ powder and $Bi_{0.2}Sr_{0.8}CoO_{3-\delta}$ held at constant current density 2.4 mA $g^{-1}$ for 50 h (C/50) in $O_2$-saturated 1 M KOH, both deposited on glassy carbon substrate. Experiments were performed for oxides films containing Nafion and acetylene black carbon supported on a glassy carbon electrode with an oxide loading of 0.25 $mg_{oxide}\ cm^{-2}_{disk}$.
Figure 13:
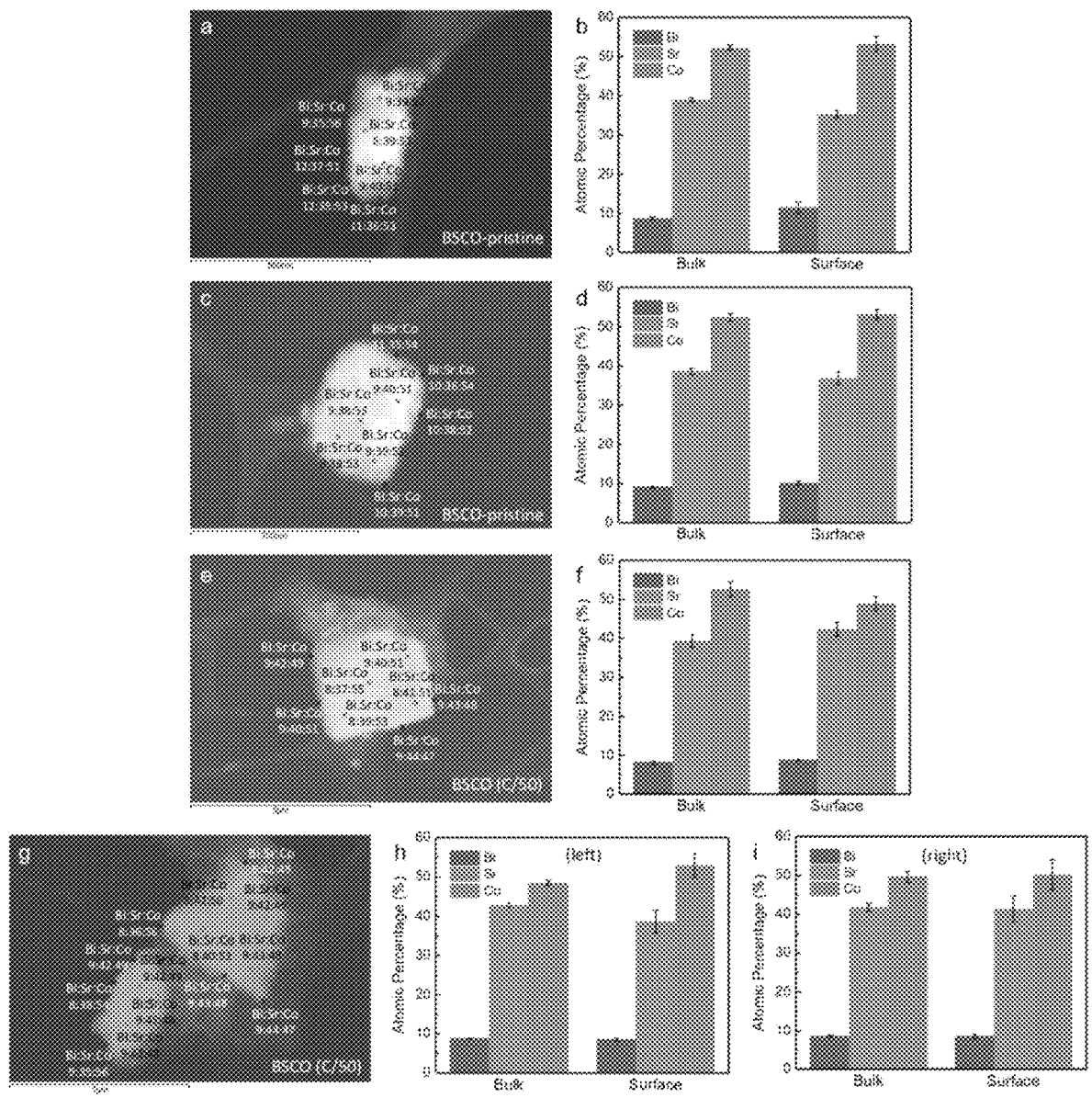
FIG. 13 is a series of graphs depicting the bulk and surface Bi, Sr and Co metal composition of individual $Bi_{0.2}Sr_{0.8}CoO_{3-\delta}$ particles before and after charging and OER measurements as determined by EDX.

Given that some highly active perovskite oxides, e.g. $Ba_{0.5}Sr_{0.5}Co_{0.8}Fe_{0.2}O_{3-\delta}$ (BSCF) are known to amorphize during OER and also has low Tafel slopes for OER (~40-50 mV decade$^{-1}$), we have performed transmission electron microscopy (TEM) imaging and EDX elemental analysis (FIGS. 5A-5D and 13) of $Bi_{0.2}Sr_{0.8}CoO_{3-\delta}$ before and after galvanostatic charging (to 1.4 V vs. RHE at C/50, FIG. 8) and subsequent OER measurements. See, for example, Suntivich, J.; May, K. J.; Gasteiger, H. A.; Goodenough, J. B.; Shao-Horn, Y. A Perovskite Oxide Optimized for Oxygen Evolution Catalysis from Molecular Orbital Principles. *Science* 2011, 334, 1383-1385; and May, K. J.; Carlton, C. E.; Stoerzinger, K. A.; Risch, M.; Suntivich, J.; Lee, Y.-L.; Grimaud, A.; Shao-Horn, Y. Influence of Oxygen Evolution during Water Oxidation on the Surface of Perovskite Oxide Catalysts. *J. Phys. Chem. Lett.* 2012, 3, 3264-3270, each of which is incorporated by reference in its entirety. No surface amorphization of charged and cycled $Bi_{0.2}Sr_{0.8}CoO_{3-\delta}$ was detected from TEM imaging (FIG. 4B) and Raman spectroscopy (FIG. 12), whereas for BSCF rapid surface amorphization, A-site metal leaching and the formation of surface edge-sharing octahedra layers at OER potential were reported. Moreover, EDX elemental analysis (FIGS. 5C, 5D and 13) revealed no notable changes in the surface composition of $Bi_{0.2}Sr_{0.8}CoO_{3-\delta}$ particles after galvanostatic charging and OER measurements, therefore confirming no A-site or B-site metal leaching and also implying that the valence state of the cobalt atoms on the surface are the same as in the bulk. The results above confirmed the high stability of $Bi_{0.2}Sr_{0.8}CoO_{3-\delta}$ after galvanostatic charging and at OER potentials.

Figure 6A:
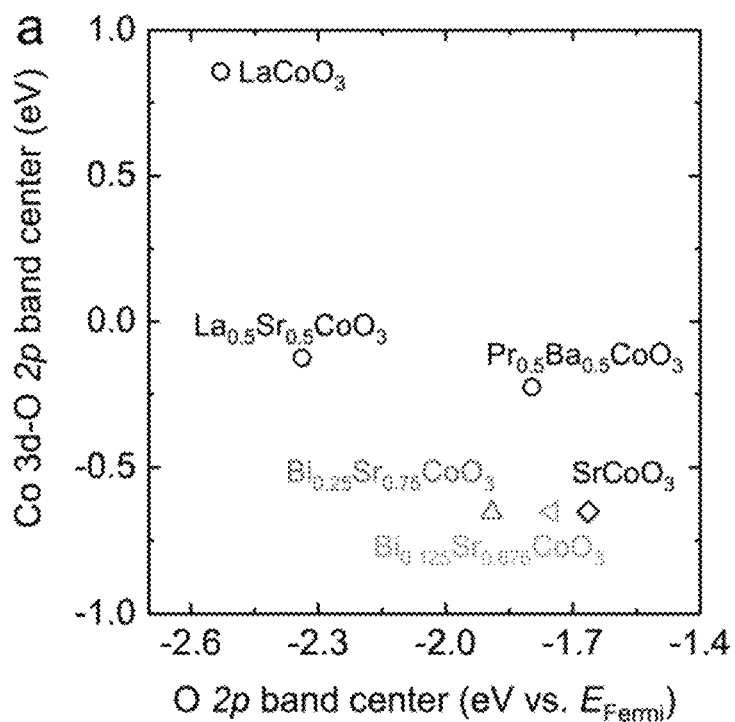
FIG. 6A is a graph depicting the difference between the Co 3d band center and the O 2p band center versus the O 2p band center relative to the Fermi level for different stoichiometric $ACoO_3$ perovskites. Data for $LaCoO_3$, $La_{0.5}Sr_{0.5}CoO_3$, $Pr_{0.5}Ba_{0.5}CoO_3$ are taken from Grimaud, A.; Diaz-Morales, O.; Han, B.; Hong, W. T.; Lee, Y.-L.; Giordano, L.; Stoerzinger, K. A.; Koper, M. T. M.; Shao-Horn, Y. Activating Lattice Oxygen Redox Reactions in Metal Oxides to Catalyse Oxygen Evolution. *Nat. Chem.* 2017, 9, 457-465, which is incorporated by reference in its entirety.
Figure 6B:
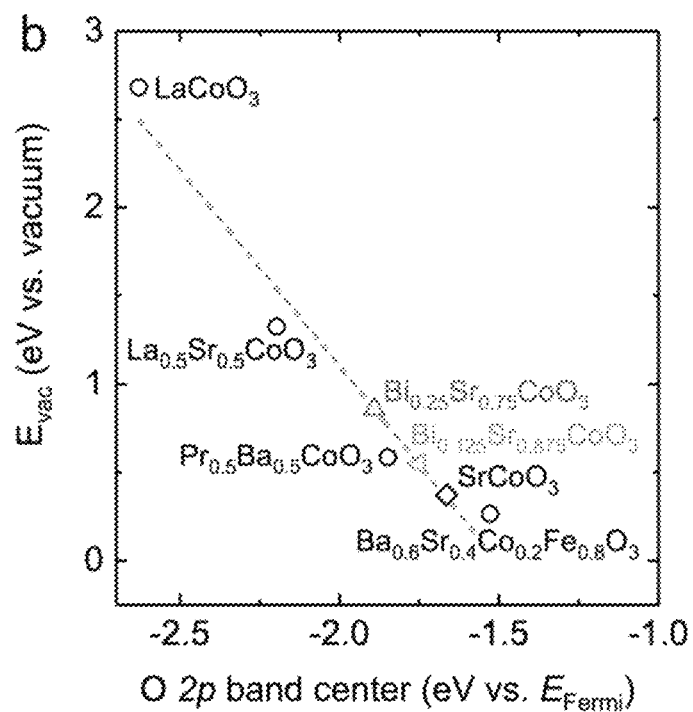
FIG. 6B is a graph depicting computed enthalpy of formation of an oxygen vacancy (relative to $O_2$) compared to the computed oxygen 2p-band center relative to the Fermi level for $LaCoO_3$, $La_{0.5}Sr_{0.5}CoO_3$, $Pr_{0.5}Ba_{0.5}CoO_3$, $SrCoO_3$, and $Ba_{0.6}Sr_{0.4}Co_{0.2}Fe_{0.8}O_3$ with full oxygen stoichiometry, showing the nearly linear correlation between oxygen vacancy formation energetics and the oxygen 2p-band center relative to the Fermi level. Data for $LaCoO_3$, $La_{0.5}Sr_{0.5}CoO_3$, $Pr_{0.5}Ba_{0.5}CoO_3$, $SrCoO_3(E_{vac}$ only), and $Ba_{0.6}Sr_{0.4}Co_{0.2}Fe_{0.8}O_3$ are taken from Lee, Y.-L.; Kleis, J.; Rossmeisl, J.; Shao-Horn, Y.; Morgan, D. Prediction of Solid Oxide Fuel Cell Cathode Activity with First-Principles Descriptors. *Energy Environ. Sci.* 2011, 4, 3966-3970, which is incorporated by reference in its entirety. The enthalpy of formation of an oxygen vacancy for fully stoichiometric $Bi_{0.125}Sr_{0.875}CoO_3$ and $Bi_{0.25}Sr_{0.75}CoO_3$ was further projected following the linear correlation and with the computed oxygen 2p band centers of these two compounds.
Figure 14:
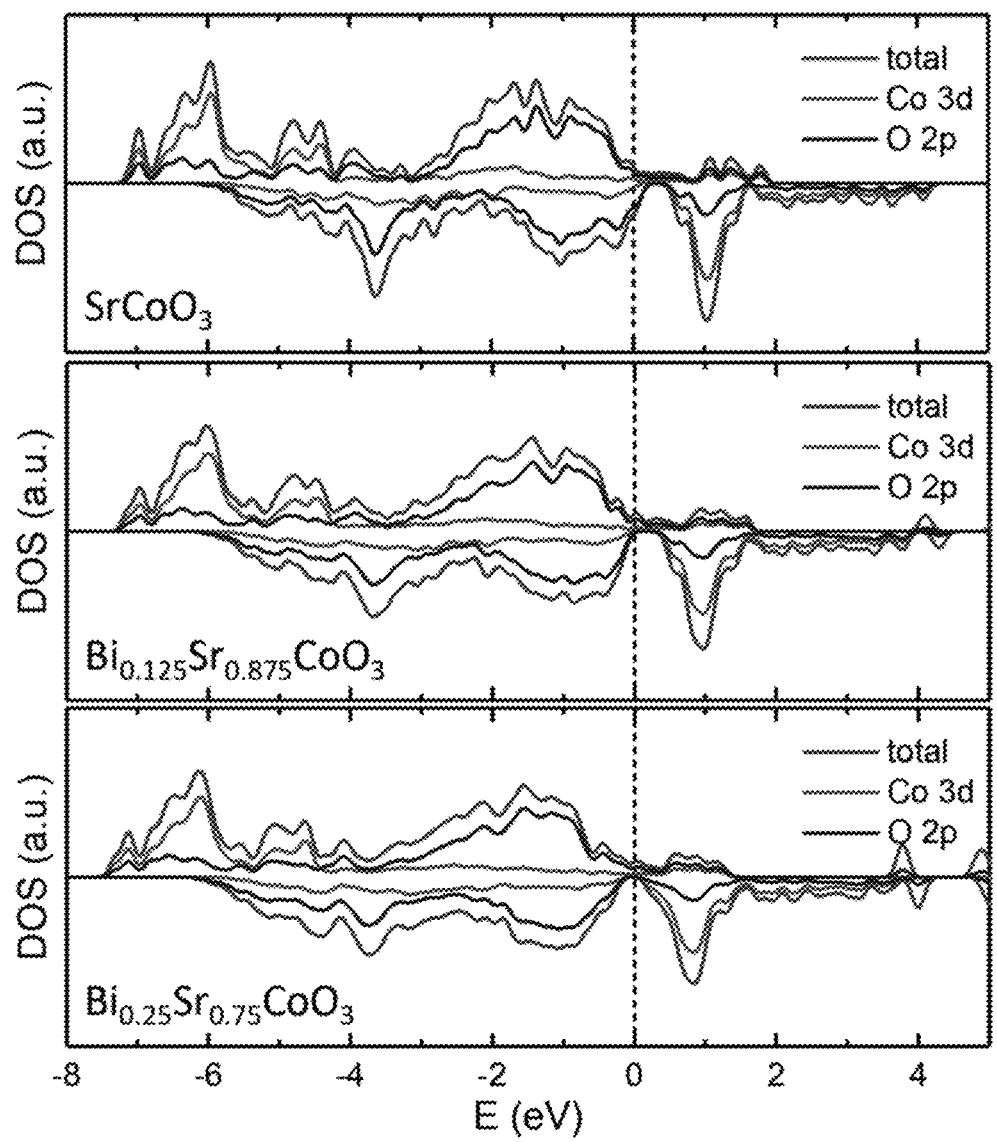
FIG. 14 is a series of graphs depicting calculated total density of states (DOS) and DOS projected on Co 3d and O 2p states of stoichiometric $SrCoO_3$, $Bi_{0.125}Sr_{0.875}CoO_3$ and $Bi_{0.25}Sr_{0.75}CoO_3$ perovskites. Dashed black lines correspond to the position of the Fermi level.
Figure 15:
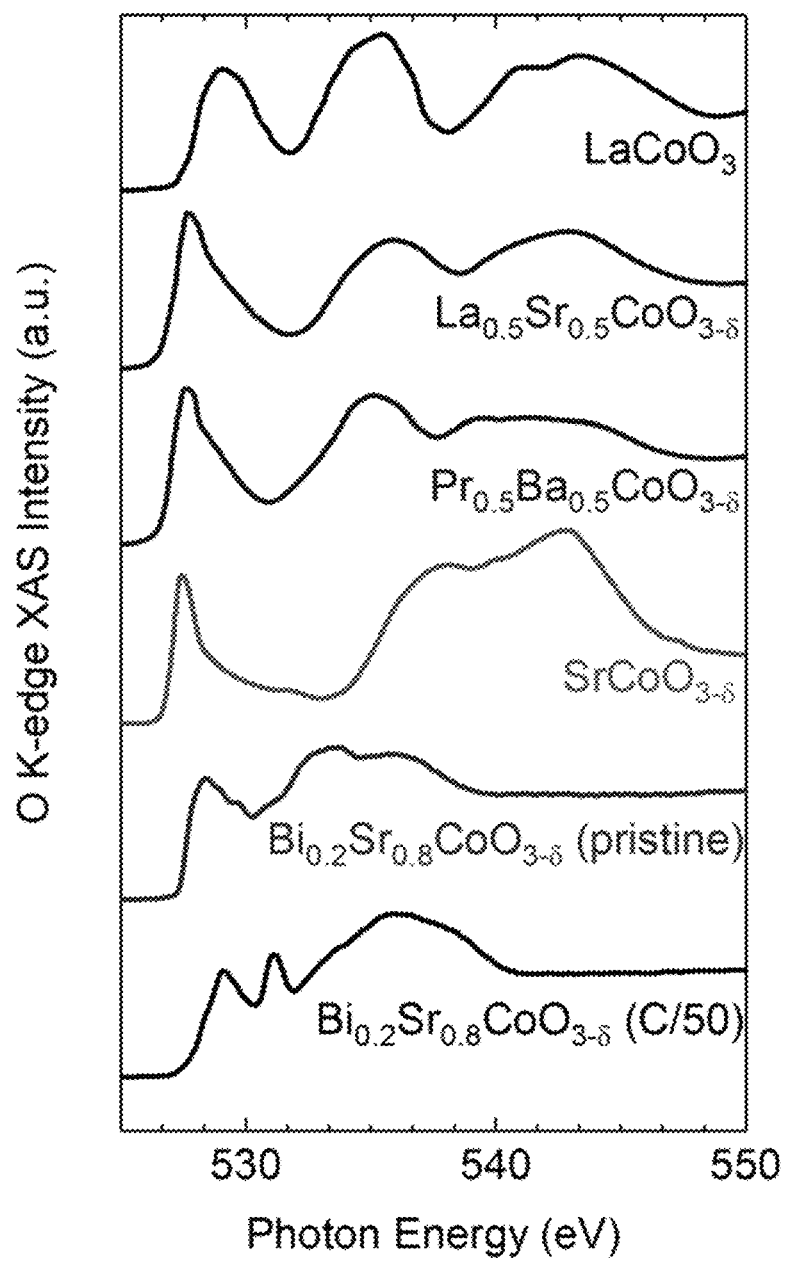
FIG. 15 is a graph depicting O K-edge XAS spectra of different $ACoO_3$ perovskites. Data for $LaCoO_3$, $La_{0.5}Sr_{0.5}CoO_3$, $Pr_{0.5}Ba_{0.5}CoO_3$ are taken Rao, R. R.; Kolb, M. J.; Halck, N. B.; Pedersen, A. F.; Mehta, A.; You, H.; Stoerzinger, K. A.; Feng, Z.; Hansen, H. A.; Zhou, H.; et al. Towards Identifying the Active Sites on RuO2(110) in Catalyzing Oxygen Evolution. *Energy Environ. Sci.* 2017, 10, 2626-2637, which is incorporated by reference in its entirety.

The high stability observed for $Bi_{0.2}Sr_{0.8}CoO_{3-\delta}$ can be attributed to the inductive effect associated with $Bi_{3+}$ substitution, which is supported by our computed Density of States (DOS) of fully oxidized $Bi_{0.125}Sr_{0.875}CoO_3$ and $Bi_{0.25}Sr_{0.75}CoO_3$. The results show the shift of Co 3d band center of $Bi_{0.25}Sr_{0.75}CoO_3$ to lower energy relative to the Fermi level by ~0.25 eV after 25% of $Sr^{2+}$ in $SrCoO_3$ was substituted by the more electronegative $Bi^{3+}$ (FIG. 14). Interestingly, the O 2p band center was also shifted to lower energy by roughly the same amount (FIG. 6A). Given that the O 2p band center can be correlated to the formation enthalpy of oxygen vacancies in perovskite oxides, having relatively low O 2p band center among highly-OER-active perovskites (FIG. 6B) confirm the high stability of $Bi_{0.2}Sr_{0.8}CoO_{3-\delta}$. See, for example, Lee, Y.-L.; Kleis, J.; Rossmeisl, J.; Shao-Horn, Y.; Morgan, D. Prediction of Solid Oxide Fuel Cell Cathode Activity with First-Principles Descriptors. *Energy Environ. Sci.* 2011, 4, 3966-3970, which is incorporated by reference in its entirety. Moreover, the high Co—O covalency of $SrCoO_3$ retains after Bi substitution (FIG. 5A), and this might explain why $Bi_{0.2}Sr_{0.8}CoO_{3-\delta}$ also has high intrinsic OER activity. Interestingly, the position of the oxygen 2p band center and enthalpy of oxygen vacancy formation (both critical to the OER performance), within the $Bi_xSr_{1-x}CoO_3$ family (x=0, 0.125, 0.250), scale linearly with x (FIGS. 6A and 6B), that allows us to hypothesize that experimentally observed catalytic activity would also scale with x value within this substitution range. The significant change in the electronic structures is reflected in the O K-edge XAS spectra when compared with different $LnCoO_3$ perovskites (FIG. 15).

The low Tafel slope can give rise to much higher current densities at high potentials for $Bi_{0.2}Sr_{0.8}CoO_{3-\delta}$ compared to $SrCoO_{3-\delta}$ which might originate from enhanced surface deprotonation due to the presence of the highly Lewis acidic $Bi^{3+}$ at oxide surface, whereas the cobalt is the site where binding of the oxygen species (*O, *OH, *OOH) occurs. The high Lewis acidity of $Bi^{3+}$ can increase the ionicity of the O—H bonds of surface adsorbed hydroxo- or hydroperoxo-groups and consequently facilitates the kinetics if the rate determining step is associated with the deprotonation of these surface species.

The OER activity of $Bi_{0.2}Sr_{0.8}CoO_{3-\delta}$ perovskite oxide is reported in alkaline electrolyte. The inductive effect and enhanced surface deprotonation associated with bismuth substitution results in dramatic improvements of catalytic performance compared to the parent $SrCoO_{3-\delta}$ material is shown. A comparison of the intrinsic OER activity of $Bi_{0.2}Sr_{0.8}CoO_{3-\delta}$ in alkaline media with that of the current state-of-the-art materials demonstrated that $Bi_{0.2}Sr_{0.8}CoO_{3-\delta}$ clearly outperforms previously reported compounds setting a new benchmark for OER catalysis in alkaline media. The observed pH dependence of redox features and OER activity on RHE scale allowed us to deduce important details of the OER mechanism catalyzed by $Bi_{0.2}Sr_{0.8}CoO_{3-\delta}$. By demonstrating the tremendous effect of metal substitution on the performance of the materials via the inductive effect, this work also highlights new prospects for the design of the novel materials for catalytic applications.

Catalytic materials useful in electrochemical systems can have the formula (I):

$$Bi_xSr_{1-x}CoO_{3\pm\delta} \qquad (I)$$

where x is in the range of 0.1 to 0.4, for example, 0.15, 0.20, 0.25, 0.30, or 0.35, and δ is in the range of 0 to 1. δ can represent the average number of oxygen-site vacancies (i.e., −δ) or surpluses (i.e., +δ); in some cases, δ is in the range of 0 to 0.5, 0 to 0.25, 0 to 0.15, 0 to 0.1, or 0 to 0.05. In some cases, δ can be approximately zero, i.e., the number of oxygen-site vacancies or surpluses is effectively zero.

Compositions, electrodes, systems, and methods for carrying out the OER and other electrochemical techniques are described. The compositions, electrodes, and systems can include catalytic materials, typically used for hydrogen/oxygen generation or metal formation, where the catalytic material includes an oxide. In some cases, the oxide can be a perovskite oxide. The systems can operate with improved activity, e.g., at low absolute value of the overpotential, high current density, significant efficiency, stability, or a combination of these. The catalytic materials can also be free of expensive precious metals or precious metal oxides. The systems also can operate at or higher than neutral pH, without necessarily requiring highly pure solvent sources, or any combination. The compositions, electrodes, systems, and methods are useful in applications such as energy storage, energy use, and production of hydrogen and/or oxygen gases.

Although the compositions, electrodes, systems, and methods described are primarily related to the OER, they are not limited in this way. Where a system is described as involving a first electrode and/or a second electrode (one or both of which can include a catalytic material), with production of oxygen gas via water electrolysis at the first electrode and/or production of hydrogen gas at the second electrode, it is to be understood that the first electrode can facilitate oxidation of water or another species to produce oxygen gas or another oxidized product. Examples of reactants that can be oxidized in this context can include methanol, formic acid, ammonia, etc. Examples of oxidized products can include $CO_2$, $N_2$, etc. At the second electrode, a reaction can be facilitated in which water (or hydrogen ions) is reduced to make hydrogen gas, but it is to be understood that a variety of reactants not limited to water (e.g., metal oxides or ions, acetic acid, phosphoric acid, etc.) can be reduced to form hydrogen gas and/or metals and/or other products of the reduction reaction (e.g., metal hydroxides, acetate, phosphate, etc.). This reaction at the second electrode can be run in reverse, in "fuel cell" operation, such that hydrogen gas (and/or other exemplary products noted above) is oxidized to form water (and/or other exemplary reactants noted above). In some cases, the compositions, electrodes, methods, and/or systems may be used for reducing hydrogen gas. In some cases, the compositions, electrodes, methods, and/or systems may be used in connection with a photoelectrochemical cell.

Electrolytic devices, fuel cells, and metal-air batteries are non-limiting examples of electrochemical devices provided herein. Energy can be supplied to electrolytic devices by photovoltaic cells, wind power generators, or other energy sources.

Electrolysis refers to the use of an electric current to drive an otherwise non-spontaneous chemical reaction. For example, electrolysis involves a change in redox state of at least one species, and/or formation and/or breaking of at least one chemical bond, by the application of an electric current. Electrolysis of water generally involves splitting water into oxygen gas and hydrogen gas, or oxygen gas and another hydrogen-containing species, or hydrogen gas and another oxygen-containing species, or a combination. In some embodiments, the systems described herein are capable of catalyzing the reverse reaction. That is, a system can be used to produce energy from combining hydrogen and oxygen gases (or other fuels) to produce water.

A power source may supply DC or AC voltage in an electrochemical system. Non-limiting examples include batteries, power grids, regenerative power supplies (e.g., wind power generators, photovoltaic cells, tidal energy generators), generators, and the like. The power source can include one or more such power supplies (e.g., batteries and a photovoltaic cell). In a particular embodiment, the power supply can be one or more photovoltaic cells. In some cases, an electrochemical system may be constructed and arranged to be electrically connectable to and able to be driven by a photovoltaic cell (e.g., the photovoltaic cell may be the voltage or power source for the system). Photovoltaic cells include a photoactive material, which absorbs and converts light to electrical energy.

An electrochemical system may be combined with additional electrochemical system to form a larger device or system. This may take the form of a stack of devices or subsystems (e.g., fuel cell and/or electrolytic device and/or metal-air battery) to form a larger device or system.

Various components of a device, such as the electrodes, power source, electrolyte, separator, container, circuitry, insulating material, gate electrode, etc. can be fabricated by those of ordinary skill in the art from any of a variety of components, as well as those described in any of those patent applications described herein. Components may be molded, machined, extruded, pressed, isopressed, infiltrated, coated, in green or fired states, or formed by any other suitable technique. Those of ordinary skill in the art are readily aware of techniques for forming components of devices herein.

Generally speaking, an electrochemical system includes two electrodes (i.e., an anode and a cathode) in contact with an electrolyte. The electrodes are electrically connected to one another; the electrical connection can, depending on the intended use of the system, include a power source (when the desired electrochemical reactions require electrical energy) or an electrical load (when the desired electrochemical reactions produce electrical energy). An electrochemical system can be used for producing, storing, or converting chemical and/or electrical energy.

Figure 16:
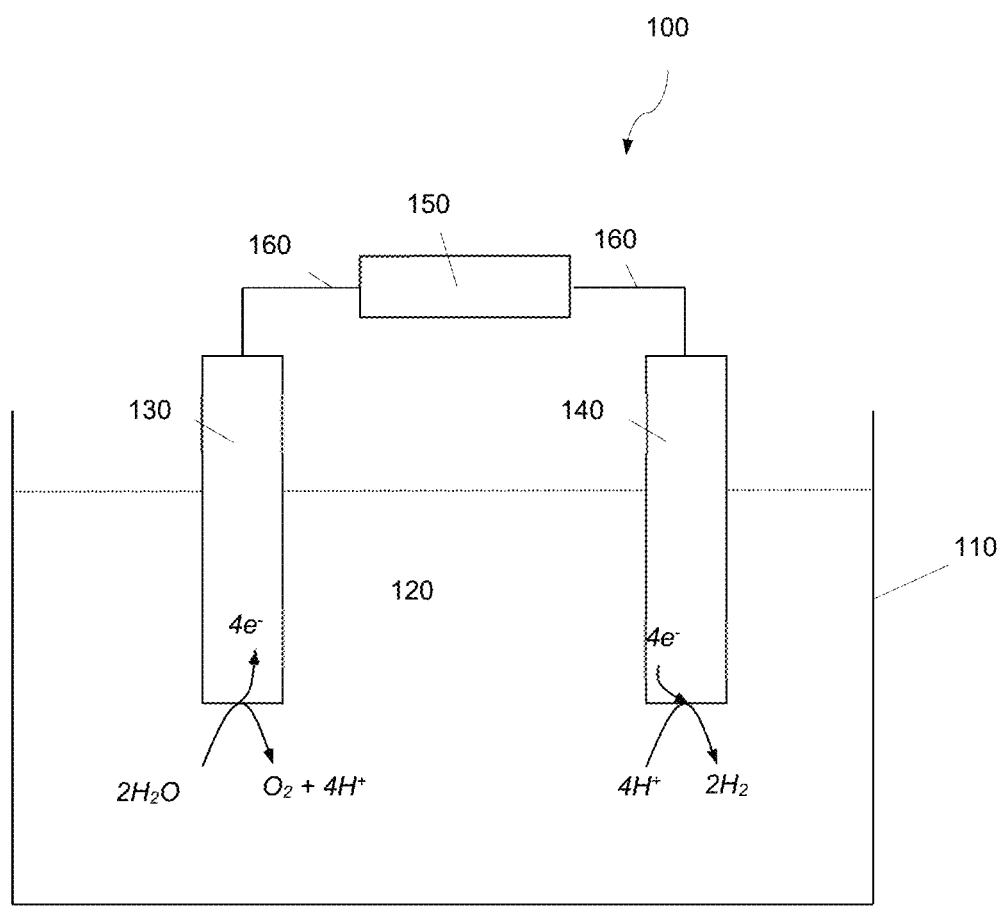
FIG. 16 schematically illustrates an electrochemical system.

FIG. 16 schematically illustrates electrochemical system 100, which includes vessel 110 containing an electrolyte 120. First electrode 130 and second electrode 140 are each in contact with electrolyte 120. FIG. 16 shows the system configured for electrolysis of water, however other configurations of a general electrochemical system are possible. For example, an electrochemical system can include a fuel cell, where hydrogen gas and oxygen gas are converted to water and electricity, which can be used to drive an electrical load.

Electrodes 130 and 140 can each individually include a catalytic material; in particular, in the configuration shown, electrode 130 can include a catalyst effective for catalyzing the OER. Power source 150 is connected by electrical connectors 160 to electrodes 130 and 140. In this way, power source 150 can supply a potential difference between electrodes 130 and 140. At certain values of the potential difference, the reactions shown can occur, including the OER at electrode 130. In the configuration illustrated, hydrogen gas can be produced at electrode 140.

Further details of devices and systems, including details of electrode construction, are known in the art. In this regard, see, for example, US Patent Application Publication Nos. 2011/0048962, 2010/0028746, and 2009/0068541, each of which is incorporated by reference in its entirety.

EXAMPLES

Experimental Details

Synthesis and characterization. $Bi_2O_3$ (99.999%, Sigma), CoO (99.99%, Sigma), $Co_3O_4$ (99.9985%, Alfa Aesar), $SrCO_3$ (99.9%, Sigma), $Sr(NO_3)_2$ (99.9965%, Alfa Aesar), $Bi(NO_3)_3 \cdot 5H_2O$ (99.999%, Sigma), $La_2O_3$ (99.99%, Sigma), $Sm_2O_3$ (99.9%, Fisher), $Gd_2O_3$ (99.9%, Sigma), $Nd_2O_3$ (99.99%, Sigma), $Eu_2O_3$ (99.99%, Fisher), EDTA (99.995%, Sigma), citric acid hydrate (99.5%, Alfa Aesar) were used without further purification, except that $Bi_2O_3$ and $Ln_2O_3$ oxides (Ln=lanthanide) were heated in air at 600-800° C. for 6 hours for dehydration. $Bi_{0.2}Sr_{0.8}CoO_{3-\delta}$ was synthesized using solid-state route starting from $Bi_2O_3$, CoO and $SrCO_3$ precursors[17]. Stoichiometric amount of powders were thoroughly ground in agate mortar, pelletized and fired in air at temperatures 850, 900 and finally 950° C. for 15 h each with intermediate regrinding. The samples were quenched to room temperature after every heat treatment in order to minimize the fraction of the secondary phase of $Bi_2Sr_2Co_3O_y$,[17] which might be detected by peaks at ca. 24° and 30° on XRD spectra[48]. $LnCoO_3$ oxides were synthesized using solid-state route starting from $Ln_2O_3$ and $Co_3O_4$ precursors. Stoichiometric amount of powders were thoroughly ground in agate mortar, pelletized and heated in oxygen flow for 40 h at 1200° C. with intermediate regrinding.

Powder X-ray diffraction (PXRD) patterns were recorded with a Bruker Advance II diffractometer equipped with a θ/2θ Bragg-Brentano geometry and Ni-filtered CuKα radiation ($K\alpha_1$=1.5406 Å, $K\alpha_2$=1.5444 Å, $K\alpha_1/K\alpha_2$=0.5). The tube voltage and current were 40 kV and 40 mA, respectively. Lattice parameters as assessed by powder X-ray diffraction (XRD) measurements are consistent with those reported previously.

The specific surface area of each oxide sample was determined using BET analysis on a Quantachrome Chem-BET Pulsar from a single-point BET analysis performed after 12 h outgassing at 150° C.

TEM imaging was conducted on a JEOL 2010 transmission electron microscope operated at 200 KeV, which is equipped with a field-emission electron gun and an ultrahigh resolution pole piece, resulting in a point-to-point resolution of 1.9 Å, with the ability to image lattice fringes at 1.4 Å resolution. Fourier analysis was performed using the Gatan Digital Micrograph software v2.01 (Gatan). JEOL 2010F transmission electron microscope (TEM) equipped with the ultrahigh resolution polepiece was used to collect HADDF-STEM images and energy dispersive spectroscopy (EDS) in this work, which has a point resolution of 0.19 nm. Parallel-beam EDS results were collected and analyzed using INCA (Oxford Instruments) software. For each sample, at least three different spots with a diameter of 2 nm were used to collect the bulk chemical compositions and surface chemical compositions. Error bars of elemental compositions obtained from EDS data represent the standard deviation of the results on at least three spots. Samples of pristine BSCO were prepared by sonicating BSCO powder in THF for a few minutes. The dispersion was then drop casted on a lacy carbon grid. Samples of charged electrode were prepared by swabbing the glassy carbon surface, which was previously washed with ethanol to remove KOH remaining on the surface after charging experiments. Electrochemical measurements. Electrodes used for CV and galvanostatic measurements were prepared by drop-casting ink containing oxide catalyst powder on a glassy carbon electrode[49]. The glassy carbon electrode surface (0.196 $cm^{-2}$) was loaded with 0.25 $mg_{oxide}$ $cm_{disk}^{-2}$ using the mass ratio of 5:1:1 (oxide catalyst: acetylene black carbon: Nafion). Alternatively, electrodes for galvanostatic experiments were also prepared by attaching pelletized powder (60 mg, 5 mm diameter) to a graphene sheet (0.12 mm thickness) using carbon paste. Galvanostatic charging was performed using a current density set at a C-rate of C/20 or C/50, meaning the exchange of 1 mole of electrons per mole of oxide in 20 or 50 hours. Pellet was carefully ground after galvanostatic charging experiments (FIG. 8), and the powder was examined by XRD.

Figure 11:
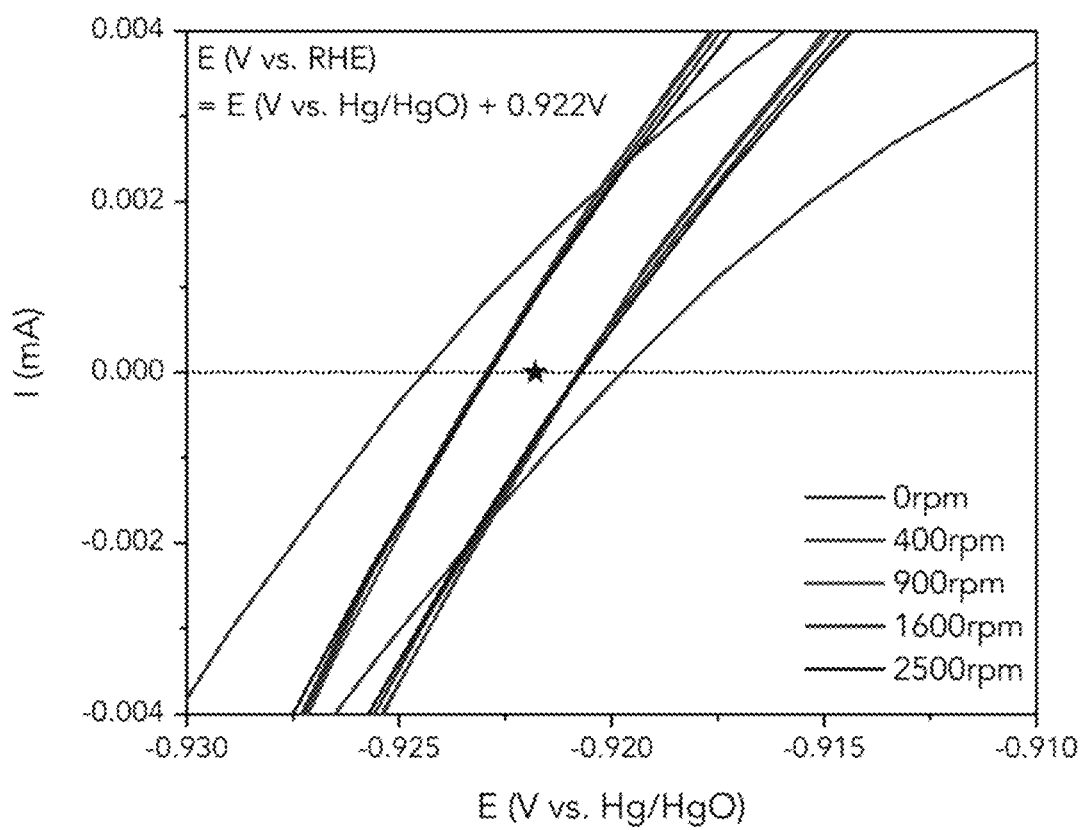
FIG. 11 is a graph depicting calibration of Hg/HgO reference electrode versus RHE. CV scans were recorded at scan rate 10 mV $s^{-1}$ in 3 electrode setup with 5 mm diameter polycrystalline platinum working electrode, Pt wire counter electrode and Hg/HgO reference electrode in $H_2$-saturated 1 M KOH electrolyte with different rotation rates. The analogous procedure was adopted for calibration of the reference electrodes in 0.1 M, 0.3 M KOH electrolytes. For 0.03 M KOH Ag/AgCl reference electrode was used instead of Hg/HgO.

OER measurements were performed with a rotating disk-electrode setup in oxygen-saturated KOH using a glass electrochemical cell with Ag/AgCl reference electrode (for 0.03 M KOH electrolyte) or Hg/HgO reference electrode (for 0.1 M, 0.3 M and 1 M KOH electrolyte) and Pt counter electrode. 0.03 M, 0.1M, 0.3 M and 1 M KOH (99.99% purity, Sigma-Aldrich) electrolyte solutions were prepared using deionized water (>18 MΩ cm). The potential was controlled using a Biologic SP-300 potentiostat. A scan rate of 10 mV s$^{-1}$ was used for all CV and rotation was set to 1600 rpm. The Ag/AgCl and Hg/HgO reference electrodes were calibrated in the corresponding KOH electrolyte before OER experiments where the point of zero current from hydrogen oxidation/evolution at a platinum electrode at different rotation rates was defined as 0 V versus reversible hydrogen electrode (RHE) (FIG. 11).

OER kinetic currents from cyclic voltammetry were obtained by taking the average between forward and backward scans to remove capacitive current contribution, which was then corrected for ohmic losses. Ohmic losses were corrected by subtracting the ohmic voltage drop from the measured potential, using an electrolyte resistance determined by high-frequency alternating current impedance, where iR-corrected potentials are denoted as E–iR (i as the current and R as the electrolyte resistance). Galvanostatic measurements of OER activity were performed on the sample preliminary oxidized at C/50 by applying incrementally increased currents; potentials corresponding to the plateau on E-t curve were used for calculations. Error bars represent standard deviation from at least 3 independent measurements.

Density Functional Theory Calculations. DFT calculations with Hubbard U correction for the Co 3d electrons were performed with the Vienna Ab-initio Simulation Package (VASP) using the projector-augmented plane-wave method with a cutoff of 450 eV. See, for example, Lee, Y.-L.; Kleis, J.; Rossmeisl, J.; Shao-Horn, Y.; Morgan, D. Prediction of Solid Oxide Fuel Cell Cathode Activity with First-Principles Descriptors. *Energy Environ. Sci.* 2011, 4, 3966-3970; Kresse, G.; Hafner, J. Ab Initio Molecular Dynamics for Liquid Metals. *Phys. Rev. B* 1993, 47, 558-561; Kresse, G.; Furthmtiller, J. Efficient Iterative Schemes for Ab Initio Total-Energy Calculations Using a Plane-Wave Basis Set. Phys. Rev. B 1996, 54, 11169-11186; Blöchl, P. E. Projector Augmented-Wave Method. *Phys. Rev. B* 1994, 50, 17953-17979, each of which is incorporated by reference in its entirety. $U_{eff}$ value of 3.3 eV was used for Co 3d states, as optimized by fitting the formation enthalpies of oxides. Energy convergence was within 3 meV per perovskite formula unit using a Monkhorst-Pack 4×4×4 k-point mesh. The soft O_s oxygen pseudopotential was employed for oxygen. Exchange-correlation was treated in the Perdew-Wang-91 generalized gradient approximation (GGA).). See, for example, Perdew, J. P.; Wang, Y. Accurate and Simple Analytic Representation of the Electron-Gas Correlation Energy. *Phys. Rev. B* 1992, 45, 13244-13249, which is incorporated by reference in its entirety. Fully relaxed stoichiometric bulk perovskite calculations were simulated with 2×2×2 perovskite supercells. All calculations were performed in the ferromagnetic state, in order to use a consistent and tractable set of magnetic structures. Both O 2p-band and metal 3d-band centers were determined by taking the centroid of the projected density of states of O 2p and metal 3d states (both occupied and unoccupied states) relative to the Fermi level.

X-ray Absorption Spectroscopy. XAS data were collected at Beamline 10ID-2 of the Canadian Light Source. The experiments were performed with the samples at room temperature under ultra-high vacuum (UHV) conditions (10$^{-9}$ Torr), with the linear polarization of the incident beam 45° to the sample surfaces. The O K-edge (1s to 2p) spectra were collected in Total Fluorescence Yield (TFY) and Total Electron Yield (TEY) but the reported data is in Partial Fluorescence Yield (PEY). The O $K_{\alpha 2}$ and $K_{\alpha 3}$ line at ~521 eV were used to obtained the O K-edge XAS with and integration width of 120 eV. The Co XAS was obtained by using the $L_{\alpha 2}$ and $L_{\beta 1}$ fluorescence lines at ~770 eV and an integration width of 120 eV. The data was normalized to the incident beam intensity using the current of a gold mesh placed before the sample stage. The oxygen K-edge data was background subtracted by fitting a straight line between 520 and 525 eV and subtracting it from the data. Furthermore, the average of the last 20 eV (from 550 to 570 eV) was taken and was used to normalize the data. All of the XES spectra and the Co $L_{2,3}$-edge XAS were normalized by making the point of highest intensity equal to unity. Other embodiments are within the scope of the following claims.

What is claimed is:

1. An electrochemical system comprising a voltage source electrically connected to a first electrode and a second electrode; and an electrolyte in contact with the first electrode and the second electrode; wherein the second electrode includes a catalyst of formula (I):

$$Bi_xSr_{1-x}CoO_{3\pm\delta} \qquad (I)$$

where x is in the range of 0.1 to 0.4 and δ is in the range of 0 to 1; and wherein the system is configured such that the catalyst catalyzes the oxygen evolution reaction when an oxygen-generating voltage is applied across the first electrode and the second electrode.

2. The system of claim 1, wherein x is 0.15, 0.20, 0.25, 0.30, or 0.35.

3. The system of claim 1, wherein x is 0.20.

4. The system of claim 1, wherein δ is in the range of 0 to 0.5.

5. The system of claim 1, wherein δ is in the range of 0 to 0.15.

6. The system of claim 1, wherein δ is in the range of 0 to 0.1.

7. The system of claim 1, wherein δ is in the range of 0 to 0.05.

8. The system of claim 1, wherein δ is approximately zero.

9. An electrode comprising:
a catalyst of formula (I):

$$Bi_xSr_{1-x}CoO_{3\pm\delta} \qquad (I)$$

where x is in the range of 0.1 to 0.4 and δ is in the range of 0 to 1.

10. The electrode of claim 9, wherein x is 0.15, 0.20, 0.25, 0.30, or 0.35.

11. The electrode of claim 9, wherein x is 0.20.

12. The electrode of claim 9, wherein δ is in the range of 0 to 0.5.

13. The electrode of claim 9, wherein δ is in the range of 0 to 0.15.

14. The electrode of claim 9, wherein δ is in the range of 0 to 0.1.

15. The electrode of claim 9, wherein δ is in the range of 0 to 0.05.

16. The electrode of claim 9, wherein δ is approximately zero.

17. A method of generating oxygen, comprising:
applying the oxygen-generating voltage to the system of claim 1.

* * * * *